(12) United States Patent
Douglas

(10) Patent No.: US 7,986,054 B2
(45) Date of Patent: Jul. 26, 2011

(54) MAGNUS FORCE FLUID FLOW ENERGY HARVESTER

(75) Inventor: Joel S. Douglas, Groton, CT (US)

(73) Assignee: eGen LLC, Groton, CT (US)

( * ) Notice: Subject to any disclaimer, the term of this patent is extended or adjusted under 35 U.S.C. 154(b) by 427 days.

(21) Appl. No.: 12/184,513

(22) Filed: Aug. 1, 2008

(65) Prior Publication Data

US 2009/0058091 A1 Mar. 5, 2009

Related U.S. Application Data

(60) Provisional application No. 60/963,038, filed on Aug. 2, 2007.

(51) Int. Cl.
*F03B 13/00* (2006.01)
*H02P 9/04* (2006.01)
(52) U.S. Cl. .................................... 290/54; 60/398
(58) Field of Classification Search ............ 290/43, 290/54, 1 R; 60/398, 325, 641.7; 166/66.5, 166/65.1; 416/85, 3.1
See application file for complete search history.

(56) References Cited

U.S. PATENT DOCUMENTS

| | | | |
|---|---|---|---|
| 1,744,924 A | 1/1930 | Sargent | |
| 3,339,078 A | 8/1967 | Crompton | |
| 3,980,894 A | 9/1976 | Vary et al. | |
| 3,986,787 A | 10/1976 | Mouton, Jr. et al. | |
| 4,001,596 A | 1/1977 | Kurtzbein | |
| 4,047,832 A | 9/1977 | Sforza | |
| 4,048,947 A * | 9/1977 | Sicard | 440/8 |
| 4,095,918 A | 6/1978 | Mouton, Jr. et al. | |
| 4,103,490 A | 8/1978 | Gorlov | |
| 4,111,594 A | 9/1978 | Sforza | |
| 4,117,676 A | 10/1978 | Atencio | |
| 4,134,708 A | 1/1979 | Brauser et al. | |
| 4,163,904 A | 8/1979 | Skendrovic | |
| 4,241,579 A | 12/1980 | Borgren | |
| 4,278,894 A | 7/1981 | Ciman | |

(Continued)

FOREIGN PATENT DOCUMENTS

DE 3501807 A1 7/1986

(Continued)

OTHER PUBLICATIONS

International Search Report and Written Opinion dated Feb. 12, 2010.

*Primary Examiner* — Michael C Zarroli
(74) *Attorney, Agent, or Firm* — Michaud-Kinney Group LLP

(57) ABSTRACT

An energy harvester capable of providing motion from fluid flow includes a Magnus rotor defined by a cylinder driven by a motor causing the cylinder to rotate so that lift is created by the fluid flowing past the cylinder. A channel or system may be provided to direct the fluid flow to the cylinder. The rotating cylinder configuration is integrated into a mechanical device which is designed to transfer the lift into a mechanical motion to drive a generator. The mechanical motion due to the created lift is reversed by using a stalling mechanism and counter balanced mechanism. This creates a bidirectional motion which can be captured and used to drive a generator. The device can be utilized in either air or hydraulic environments. A modification of the energy harvester can be configured to utilize the electricity generate to produce hydrogen for use in fuel cells or for combustion.

30 Claims, 23 Drawing Sheets

U.S. PATENT DOCUMENTS

| | | | |
|---|---|---|---|
| 4,289,444 A | 9/1981 | Monk et al. | |
| 4,306,157 A | 12/1981 | Wracsaricht | |
| 4,366,386 A | 12/1982 | Hanson | |
| 4,384,212 A | 5/1983 | Lapeyre | |
| 4,412,417 A | 11/1983 | Dementhon | |
| 4,413,956 A | 11/1983 | Berg | |
| 4,423,334 A | 12/1983 | Jacobi et al. | |
| 4,446,379 A | 5/1984 | Borg et al. | |
| 4,464,080 A | 8/1984 | Gorlov | |
| 4,465,941 A | 8/1984 | Wilson et al. | |
| 4,524,285 A | 6/1985 | Rauch | |
| 4,576,581 A | 3/1986 | Borg | |
| 4,582,013 A * | 4/1986 | Holland, Jr. | 114/39.3 |
| 4,635,474 A * | 1/1987 | Blackwood | 73/170.11 |
| 4,717,832 A | 1/1988 | Harris | |
| 4,849,647 A | 7/1989 | McKenzie | |
| 5,074,710 A | 12/1991 | Gorlov | |
| 5,167,786 A * | 12/1992 | Eberle | 204/228.2 |
| 5,222,833 A | 6/1993 | Gorlov | |
| 5,426,332 A | 6/1995 | Ullman et al. | |
| 5,451,137 A | 9/1995 | Gorlov | |
| 5,451,138 A | 9/1995 | Istorik et al. | |
| 5,577,882 A | 11/1996 | Istorik et al. | |
| 5,642,984 A | 7/1997 | Gorlov | |
| 5,909,859 A | 6/1999 | Janicki | |
| 6,036,443 A | 3/2000 | Gorlov | |
| 6,155,892 A | 12/2000 | Gorlov | |
| 6,172,429 B1 | 1/2001 | Russell | |
| 6,253,700 B1 | 7/2001 | Gorlov | |
| 6,293,835 B2 | 9/2001 | Gorlov | |
| 6,375,424 B1 | 4/2002 | Scarpa | |
| 6,465,900 B1 | 10/2002 | Arcos | |
| 6,602,045 B2 | 8/2003 | Hickey | |
| 6,622,973 B2 | 9/2003 | Al-Garni et al. | |
| 6,651,511 B1 * | 11/2003 | Young | 73/861.08 |
| 6,734,576 B2 * | 5/2004 | Pacheco | 290/55 |
| 7,239,038 B1 | 7/2007 | Zimmerman et al. | |
| 7,329,099 B2 | 2/2008 | Hartman | |
| 7,427,047 B2 * | 9/2008 | Saeed Tehrani | 244/21 |
| 2001/0033790 A1 | 10/2001 | Hickey | |
| 2005/0042095 A1 | 2/2005 | Kaliski | |
| 2006/0131889 A1 | 6/2006 | Corten et al. | |
| 2007/0046029 A1 | 3/2007 | Murakami et al. | |
| 2007/0048137 A1 | 3/2007 | Hartman | |
| 2007/0160472 A1 | 7/2007 | Jobmann et al. | |
| 2008/0116692 A1 | 5/2008 | Lagstrom | |
| 2008/0145224 A1 | 6/2008 | Mitchell et al. | |
| 2008/0148723 A1 | 6/2008 | Birkestrand | |

FOREIGN PATENT DOCUMENTS

| | | |
|---|---|---|
| DE | 102005062615 A1 | 6/2007 |
| EP | 1764503 | 3/2007 |
| EP | 1764503 A2 | 6/2007 |
| GB | 2006885 | 5/1979 |
| GB | 2006885 A | 5/1979 |
| GB | 2262572 | 6/1993 |
| GB | 2262572 A | 6/1993 |
| GB | 2386160 | 9/2003 |
| JP | 2018189 A | 1/1990 |
| JP | 63167787 | 1/1990 |
| UA | 31846 U | 4/2008 |
| WO | 8604646 | 8/1986 |
| WO | 2006/055393 | 5/2006 |

* cited by examiner

End View

MAGNUS FORCE FLUID FLOW ENERGY HARVESTER

CROSS REFERENCE TO RELATED APPLICATIONS

This application claims the benefit of U.S. Provisional Patent Application No. 60/963,038 filed Aug. 2, 2007, contents of the foregoing application being incorporated herein by reference in their entirety.

TECHNICAL FIELD

This invention relates to a device for harvesting energy and more specifically to an energy harvester that extracts energy from fluid flow by exploiting the lift created by the flow as it passes a rotating cylinder. The device can be used with hydro-pneumatic, hydro, wind, or wave power systems.

BACKGROUND

Hydro power systems are used for generating power from the tidal or current motion of water in oceans, bays, and rivers. Typically, such systems require a high water head and high flow conditions. System operating requirements that include both a larger water head and high flow conditions limit the suitable sites for locating fluid flow energy harvesters. Conventional hydro turbine technology, which involves positioning a powerhouse in a dam body with turbines located below the lowest water level, has been applied at mountain river and waterfall sites where a large water head can be developed. Consequently, powerhouses using hydro turbines are generally installed in large and complicated dam structures capable of withstanding the enormous water pressures generated. On the other hand, the hydro energy potential of thousands of rivers, streams, and canals remain untapped because hydro turbines, as an economical and practical matter, do not operate effectively with a low water head, in other words, when water level differences are about three meters or less. Such conventional hydro turbines need significant water depth for installation and cost-efficient operation.

Systems have also been developed to generate power using lower water head. These systems are described in U.S. Pat. Nos. 4,717,832, 5,074,710, and 5,222,833, the disclosures of which are incorporated herein by reference.

Systems for utilizing tidal motion and current flow of oceans and rivers are also known. Such systems usually require a dam or other physical structure that separates one part of a water body from another part. A difference in water levels is thereby created which provides a pressure differential useful for driving mechanical devices such as hydro turbine generators.

Also, axial-flow turbine type devices deriving power from liquid flow in tidal runs and stream beds are known. Such devices are disclosed in U.S. Pat. No. 3,980,894 to P. Vary et al., U.S. Pat. No. 3,986,787 to W. J. Mouton, Jr., U.S. Pat. No. 4,384,212 to J. M. Lapeyre, U.S. Pat. No. 4,412,417 to D. Dementhon, and U.S. Pat. No. 4,443,708 to J. M. Lapeyre.

Pivotal flow-modifying means is shown in the above Mouton, Jr. patent in a multiple unit embodiment.

U.S. Pat. No. 4,465,941 to E. M. Wilson discloses a waterwheel type device for the purpose of flow control pivotal valves or deflectors.

Additionally, various Magnus effect generating systems have been envisioned. The Magnus effect was first publicized by Professor G. Magnus in 1853. The Magnus effect is a physical phenomenon in which a spinning object creates a current of rotating fluid about itself. As the current passes over the object, the separation of the turbulent boundary layer of flow is delayed on the side of the object that moves in the direction of the fluid flow and is advanced on the side of the object that moves counter to the direction of the fluid flow. Thus, pressure is exerted in the direction of the side of the object that moves in the same direction of the fluid flow to provide movement substantially perpendicular to the direction of fluid flow. Briefly stated, when a rotating cylinder encounters a fluid flow at an angle to its rotational axis, a lifting force (lift) is created perpendicular to the flow direction. If a rotating cylinder is mounted on a vertical axis, the lift is developed at right angles to the direction of water flowing past the cylinder, left or right depending upon the direction of rotation.

The use of the Magnus effect as a windmill was disclosed in the 1926 translation of Anton Flettner, "The Story of the Rotor," published by F. O. Willhofft, New York, N.Y. A Magnus rotor can produce ten times as much lift force as an airfoil for equal projected areas and wind speeds. The phenomenon is also used to describe, among other things, the curved pitches of baseball and the shooting of airplane guns transversely to the airplane's path of travel.

Various patents disclose the use of the Magnus effect for airplane lift, steering a boat, and for assisting in submarine steering.

The Magnus effect is utilized in U.S. Pat. No. 4,446,379 to Borg et al., which has Magnus cylinders mounted for rotation at right angles to shafts that are revolved about a generally vertical axis. The shafts are free to rotate 180 degrees. The Magnus cylinders are continuously rotated in the same angular direction. At one position of revolution of the shafts, the cylinders rotate on an axis generally parallel to the axis of revolution of the shafts. When the apparatus is immersed in a fluid flow (gaseous or liquid) a torque of rotation is developed when the shafts are aligned with the fluid flow, and this torque of rotation is reduced as the shaft approaches a position transverse to the fluid flow. As the shafts pass this transverse position, a torque is developed by the rotating cylinder that rotates the shafts 180 degrees at which point the formerly downwardly depending cylinder is now upright and the formerly upright cylinder is now downwardly depending on its shaft. The device was designed to utilize two or more shafts to which cylinders are attached, and there is continuous production of torque about the axis of revolution of the shafts. The complexity of this device makes it a difficult device to build or operate. If the Magnus effect is to be used to generate power, a simpler device is needed.

U.S. Pat. No. 4,582,013 to Holland describes a self-adjusting wind power machine that uses a Magnus rotor.

Pneumatically driven systems using turbine blades have also been developed. However, these systems normally use blades that rotate at high speeds. These rotating blades are problematic as any sizable foreign object encountered by the system can damage the blades, thereby compromising the structural integrity of the system. When the system utilizes the flow of air such as in the use of turbine blade aircraft, bird strikes can cause significant damage to the rotating blades, as can stones or other debris inadvertently or intentionally injected into the rotating blades. When the system is a water system, the injection of aquatic plants and animals as well as debris frequently found in waterways (e.g., chunks of wood) can also cause damage.

The majority of the systems envisioned by the aforementioned technologies utilize rotating blades that are noisy, detrimental to both flora and fauna, and require dams that interfere with the motion of the flowing water. Additionally, the systems that are utilized in these applications significantly obstruct sunlight, thereby detrimentally affecting aquatic plant life. These approaches are normally resisted by the affected communities due to the harm caused to flora and fauna and the damming of the body of water that negatively affects community activities. Damming and rerouting water flow can also cause significant upstream destruction of wildlife habitats.

Low head and low flow hydraulic conditions are prevalent throughout the world. The US Department of Energy (DOE) has studied the amount of low head water sources available in the United States and has published the result of that study in DOE report DOE-ID-11263 entitled Feasibility Assessment of the Water Energy Resources of the United States for New Low Power and Small Hydro Classes of Hydroelectric Plants. The difficulty described therein is that there are no simple and easy methods to harness the energy from low head water sources to create power.

Table 1 from that report provides a summary of hydroelectric energy in the United States and shows that with regard to the low head/high power and all low power sources including unconventional and microhydro sources, there is approximately 47,000 MW of power that is available for harvesting. Effectively harvesting this capacity would more than double the power currently generated by hydro sources in the United States alone.

| Annual Mean Power (MW) | Total | Developed | Excluded | Available |
|---|---|---|---|---|
| Total Power | 289,741 | 35,429 | 88,761 | 165,551 |
| Total High Power | 229,794 | 34,596 | 76,864 | 118,334 |
| High Head/High Power | 157,772 | 33,423 | 55,464 | 68,885 |
| Low Head /High Power | 72,022 | 1,173 | 21,400 | 49,449 |
| Total Low Power | 59,947 | 833 | 11,897 | 47,217 |
| High Head/Low Power | 35,403 | 373 | 9,163 | 25,868 |
| Low Head /Low Power | 24,544 | 461 | 2,734 | 21,350 |
| Conventional Turbine | 8,470 | 319 | 899 | 7,253 |
| Unconventional Turbine | 3,932 | 43 | 527 | 3,362 |
| Microhydro | 12,142 | 99 | 1,308 | 10,735 |

However, despite the technological efforts described previously there is no known system capable of generating electricity from low head/high power and low power sources such as tidal and/or river flow and being capable of continuous generation under changing flow conditions.

Given the increasing demand for industrial electricity in view of the issues related to the current state of the art of fluid flow energy harvesters, a need exists for a system that does not harm flora or fauna and can be introduced into the environment without interfering with the natural water flow or blocking the majority of the sunlight to the bottom of the body of water. A need also exists for an environmentally friendly, quiet, efficient, and simple energy harvester that can operate in low head and low flow conditions.

SUMMARY OF THE INVENTION

As used herein, the term "hydro application" and "hydraulic" are used to describe the use of the energy harvesting device with regard to liquid, and the term "gas application" and "pneumatic" used to describe the use of the energy harvesting device with regard to gas (e.g., air).

As used herein, the term "lift" refers to a force that is perpendicular to a direction of fluid flow.

As used herein, the term "electrical grid" refers to any system used to utilize or transport electrical current.

The present invention provides an energy harvesting device (or energy harvester) capable of generating energy from low power hydraulic or pneumatic flows using lift generated by the Magnus effect by taking advantage of the availability of sources of fluid flowing under low head pressure and/or flows of velocities of 1 feet per second or greater. The energy harvester comprises inflow and outflow fluid channels, an energy harvester chamber, and a revolving cylinder, which is typically mounted in a horizontal configuration and transversely to the direction of fluid flow. The inflow channel is provided with diverters and baffles to direct the flow of fluid to the cylinder. Referring to FIG. 1, as a cylinder C is spun mechanically using a small amount of power, the rotating cylinder experiences a lift force L. The direction of rotation ω of the cylinder C is such that the top of the cylinder (shown at A) is moving angularly in the same direction as the fluid (the fluid moves as shown by the arrows U). Rotation to the right indicates a positive flow U and rotation to the left indicates a negative flow U. Directing the fluid to the cylinder via the diverters and baffles increases the lift on the cylinder. More specifically, the rotating cylinder experiences lift from the fluid flow moving in the positive 'x' direction that causes the cylinder to move in the positive 'y' direction.

The lift can be transferred into a mechanical system, for example, it can be transferred to a generator via a driveshaft or a similar mechanism. This lift can also be harnessed to drive a reciprocating device.

If the flow is reversed and the direction of rotation of the cylinder remains the same, the lift will be in the opposite direction. The direction of rotation of the cylinder can also be reversed to maintain the lift in the same direction. In a practical application, the direction of fluid flow often remain constant, so to reverse the direction of lift the direction of rotation of the cylinder is reversed.

A rotor subject to the Magnus effect (Magnus rotor) can produce ten times as much lift force as an airfoil for equal projected areas and fluid speeds. The dynamic performance of the Magnus rotor is dominated by the ratio U/V, where U is the outer surface velocity of the roller section, due to the roller section spinning on its axis, and V is the velocity of the approaching fluid, perpendicular to the roller axis. The rotor is spun under mechanical power. Since the lift created is related to the cylinder diameter, rotational speed, length, and the flow of the fluid past the cylinder, the force exerted by the cylinder can be significant as the diameter of the cylinder, cylinder rotational speed and length are increased. Referring to FIG. 2, the force and power derived from a Magnus rotor 3 feet in diameter and 9 feet long is graphically shown at various flow rates of fluid.

For gas applications, the energy harvester applications are under ultra low head pressure fluid flow, and the energy harvester can readily deliver significant lift causing the system to drive a conventional industrial generator. This allows the energy harvester of the present invention to achieve efficiencies higher than energy harvesters of the prior art. For hydro applications, under ultra low head flow or any strong current of 1 foot per second or greater, which is less than needed for prior art energy harvesters. Also because the lift that is developed is dependent on the flow of the fluid (air or water) and the outer diameter speed T (FIG. 1) of the cylinder, lower fluid flow speeds can be compensated for by increasing speed T. This makes for a very scaleable application because the energy used to rotate the cylinder is very low compared to the resulting lift developed.

In the case of pneumatic energy conversion, the channel forces the air to be directed at the rotating rotor and delivers it so maximum lift is created. The energy captured in the flowing air is then converted to mechanical energy. Connection of the energy harvester to an electric generator allows for the generation of electrical energy. No additional gearing to increase the speed of the air energy harvester to the generator's speed is required.

In a hydro application embodiment, the energy harvester can be mounted in a self-floating configuration and is attached to a vessel or platform located in a current of 1 foot per second or greater, such as in a tidal channel. In such an embodiment, the energy harvester is located just below the surface of the water, where the current velocity is greatest, and is retained in that location by virtue of the rise and fall of the vessel with the water. The Magnus rotor energy harvester embodiment is uniquely suited for this application. A housing to channel the flow to the energy harvester may by provided if desired, but is not necessary if the current velocity is sufficiently great. The energy harvester is connected to a suitable electric generator, which may be mounted on the vessel in a water tight chamber or which may be remotely located. Since the energy harvester is located in the water, the lift is converted into mechanical energy to drive the generator.

Alternatively the flow can be concentrated so that the speed of the fluid passing the rotor is accelerated to increase the lift of the rotor. Channeling the flow from a larger cross section into a smaller cross section where the rotor can take advantage of the increased flow speed of the fluid facilitates an increase in the lift of the rotor.

A novel method is to use the Magnus effect to produce a rotating motion to directly drive a rotating generator. This would use a series of Magnus rotors arranged in a wheel format and either a single motor or a series of motors to drive the rotors.

A novel method is to use the Magnus effect to produce electricity is to place the Magnus rotor energy harvester in a fluid line used in a building or other structure such as a sewage line, roof drain line or other fluid carrying system. The energy harvester would be driven by the fluid moving through the fluid handling system.

An alternative generator that could be used involves the placement of a magnet on the moving energy harvester such that the magnet passes through a coil to generate a current. This eliminates the need to have the motion converted into a rotary motion to drive a generator and increases the efficiency.

BRIEF DESCRIPTION OF THE DRAWINGS

The invention will be more fully understood from the following detailed description taken in conjunction with the accompanying drawings in which.

DETAILED DESCRIPTION OF THE PREFERRED EMBODIMENTS

Figure 3:
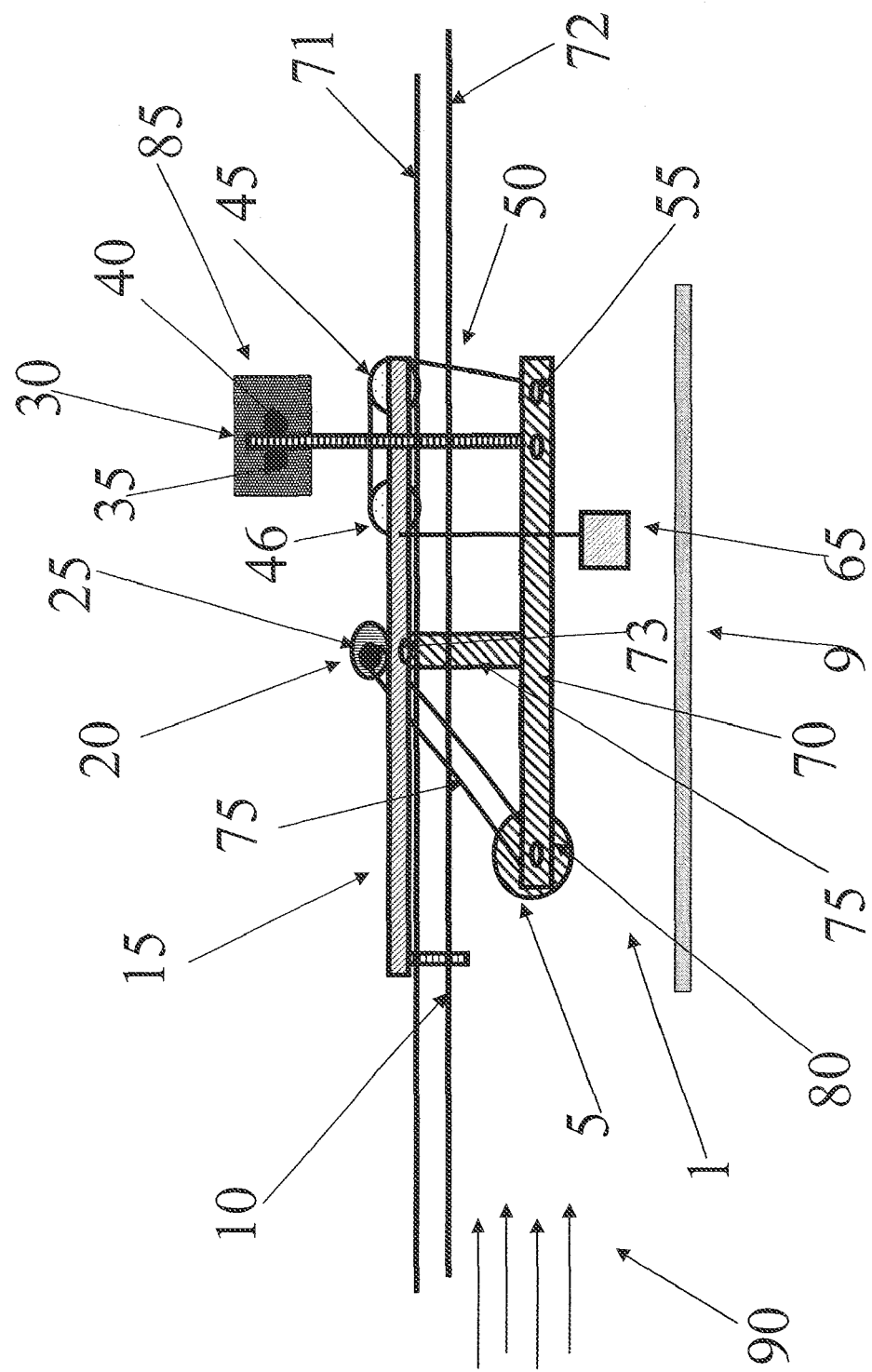
FIG. 3 is a schematic representation of a side view of an energy harvester in the down position.
Figure 4:
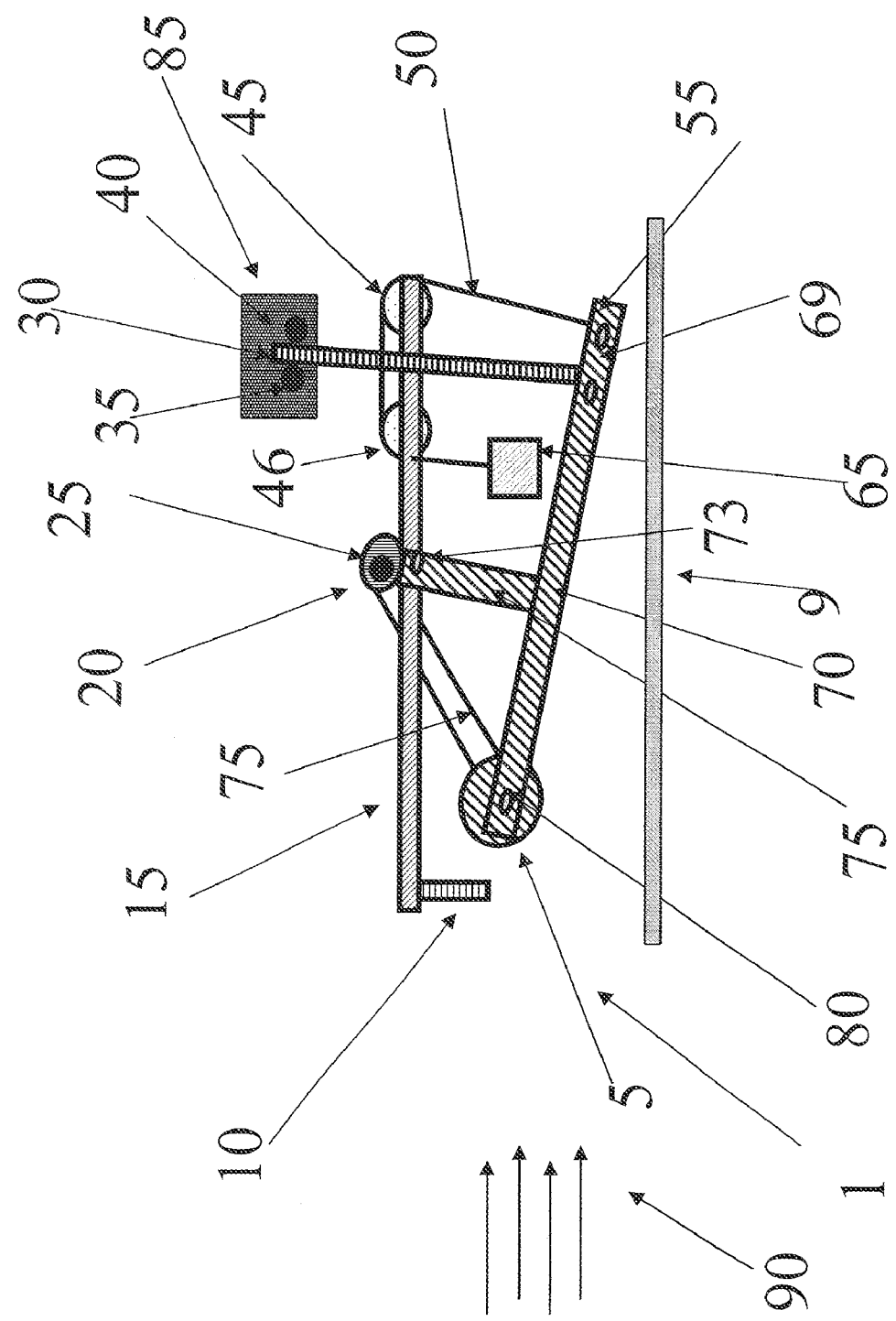
FIG. 4 is a schematic representation of a side view of the energy harvester of FIG. 3 in the up position.
Figure 5:
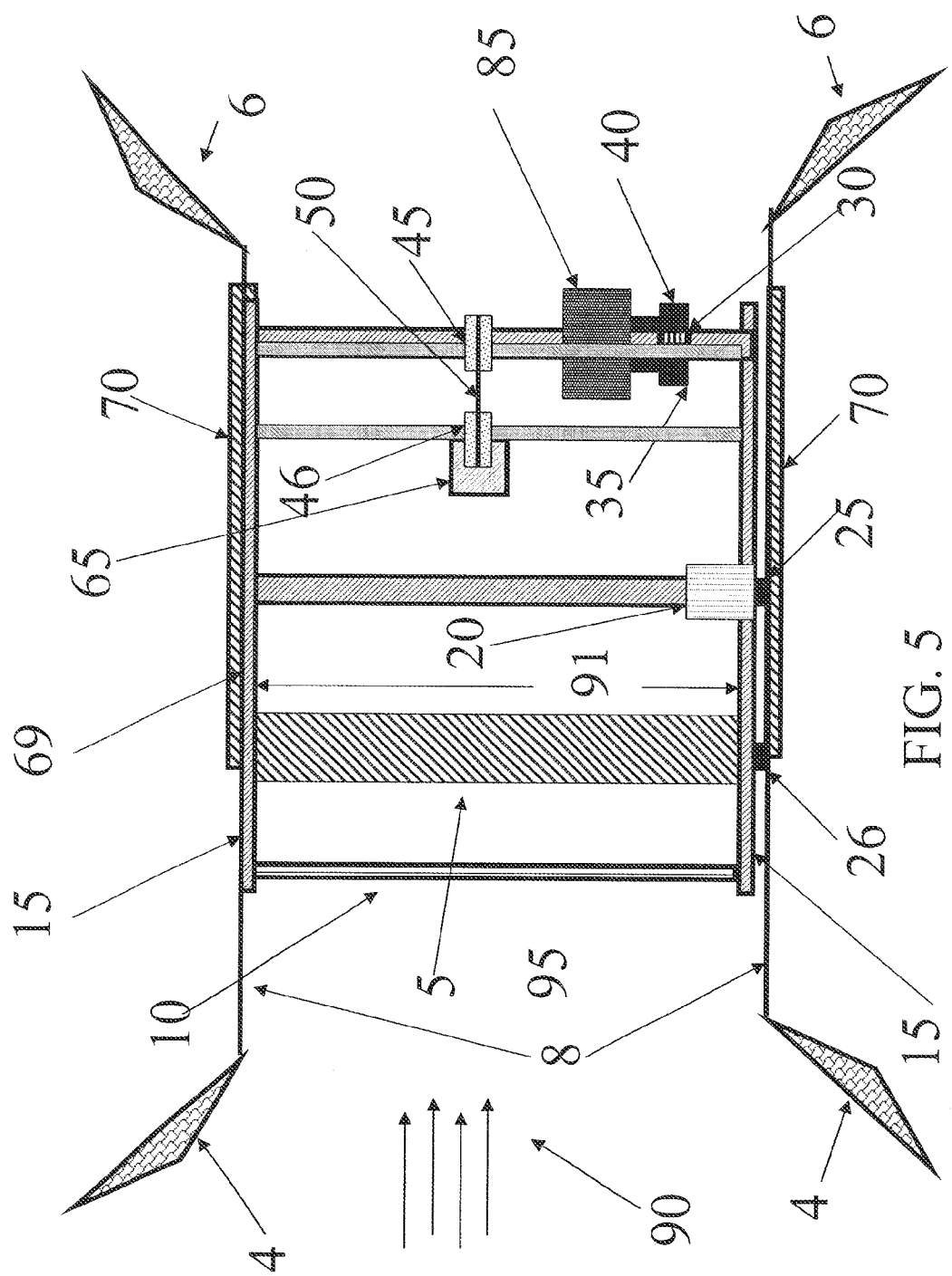
FIG. 5 is a schematic illustration of a top view of the energy harvester of FIG. 3.

An energy harvester 1 for use in hydraulic flows according to the present invention is shown in FIGS. 3, 4, and 5. The energy harvester is capable of being mounted to a structure where the energy harvester is in communication with a fluid flow. The energy harvester comprises inflow fluid channel walls 4, energy harvester channel side walls 8 that receive a flow 90 from the inflow channel walls 4, outflow fluid channel walls 6 that direct the flow from the channel side walls (shown on FIG. 5), and a Magnus rotor 5 rotatably mounted between the channel side walls. A stall baffle 10 is located downstream of the inflow fluid channel walls 4. The energy harvester 1 may also comprises side walls and a bottom chamber wall 9. The fluid flow path defined by an inflow fluid channel, an outflow fluid channel, and an energy harvester chamber disposed between said inflow fluid channel and said outflow fluid channel. The walls can also be curved either in the side or bottom walls in this configuration and having opposite elevations in the plane parallel to the fluid flow path. This acts as a concentrator for the fluid flow by channeling a greater volume of fluid to the energy harvester thereby increasing the speed of the fluid which will increase the lift generated by the rotor. This intensification can be used in any of the embodiments envisioned by the present invention.

The Magnus rotor 5 is mounted inside a channel formed by a passage 95 formed by the opposed channel side walls 8, and optional bottom chamber wall 9, the inflow fluid channel walls 4, and the outflow fluid channel walls 6. This passage 95 directs the flow 90 through the energy harvester. The Magnus rotor 5 is oriented transversely to the flow 90 through the passage 95 and is mounted for rotation, for example, via bearings 80 in rotor supports 70.

The Magnus rotor 5 is driven in rotation about an axle held in the bearings 80 by motor 20 that has a pinion 25 attached to the drive shaft of the motor, a belt 75, and a drive pinion 26 on the Magnus rotor. This motor 20 drives the Magnus rotor 5 so that adequate rotation is provided to generate lift when the flow 90 is concentrated through the channel 95. This concentrating of fluid in the channel 95 accelerates the flow 90 by funneling the fluid towards the Magnus rotor 5, thereby increasing the lift.

Referring specifically to FIGS. 3 and 4, fluid flow 90 in the direction as shown by the arrows and along the channel 95 causes lift to be exerted on the Magus rotor 5, which pushes the Magnus rotor towards support 15 by rotating a frame 69 comprised of the rotor support 70 and a rotor support arm 75 about a pivot 73 in the direction up towards support 15. Rotation of the frame 69 about the pivot 73 causes the leading edge of the frame to rotate (up) toward the support 15 while correspondingly causing the trailing edge of the frame to rotate (down) in the direction away from the support. A counterweight 65 is attached to the rotor support 70 by a pin 55 and a cable 50. The counterweight 65 utilizes a counterbalancing method, although any suitable counterbalance could be used. The cable 50 is guided in pulleys 45 and 46 rotatably mounted to a support structure attached to a barge, a floating platform, or the like.

During operation of the energy harvester 1, once the Magnus rotor 5 moves into a position behind the stall baffle 10 (relative to the direction of the flow 90), the flow is impeded and the motor 20 is stopped. The stopping of motor 20 combined with the impeded flow permits the stored energy in the counterweight 65 to return the frame 69 and the Magnus rotor 5 to the lower position where the motor 20 is restarted to re-initiate rotation of the Magnus rotor, thereby providing lift and starting the process over again. The present invention is not limited to the use of a counterweight to return the frame 69 to the lower position, however, as the motor 20 could be reversed to drive the Magnus rotor 5 down into the lower position as shown in FIG. 3.

Power is extracted from the operation of the energy harvester 1 on both the upward and the downward movements of the frame 69 via a rack 30 attached to the frame. When the frame 69 (and the Magnus rotor 5) are lifted, the rack 30 is driven so that one or more gears is rotated so power is extracted on the upstroke. When the frame 69 (and the Magnus rotor 5) are lowered, one or more gears is rotated so power is extracted on the downstroke.

Figure 13:
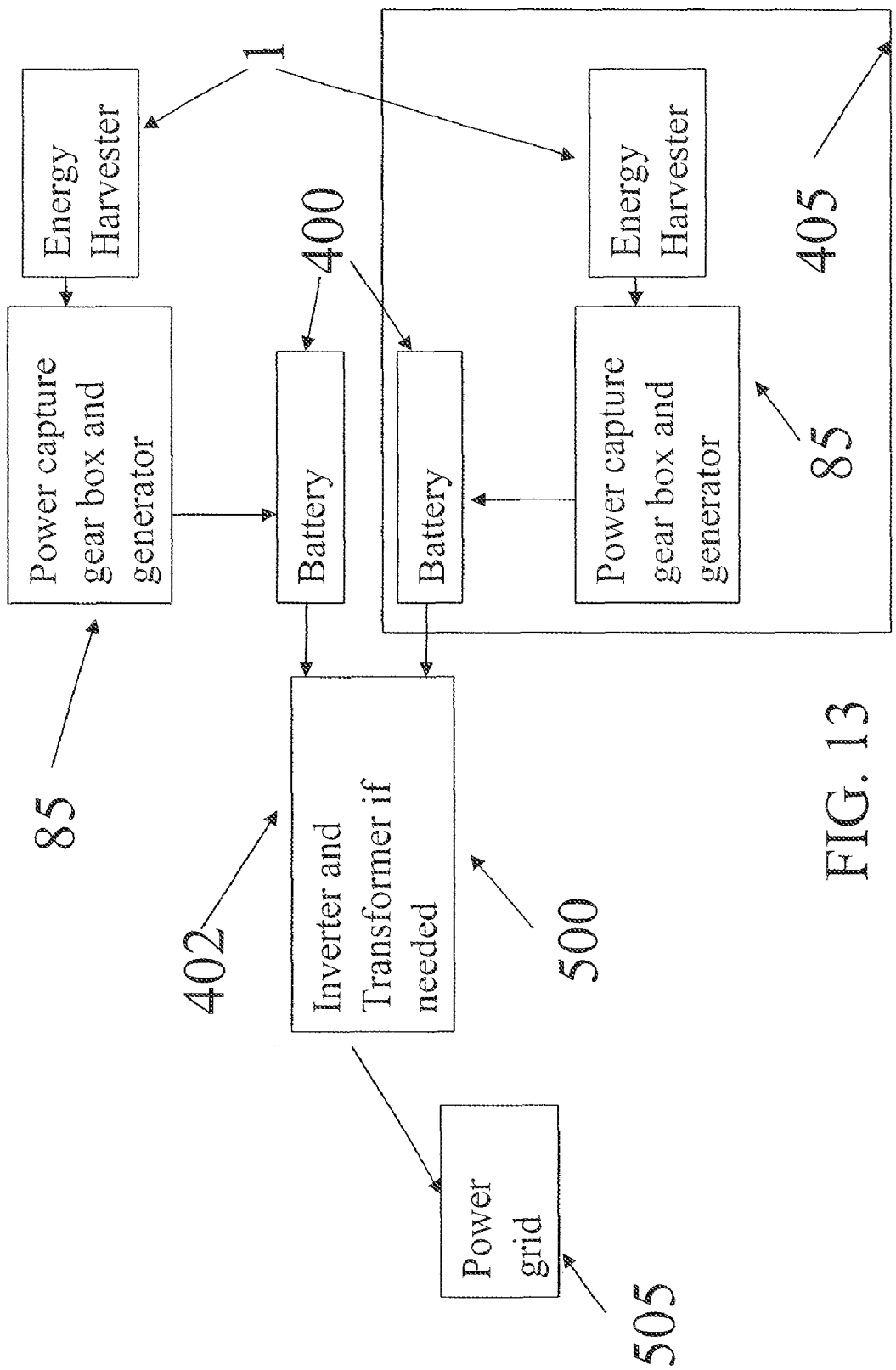
FIG. 13 is a block diagram of a process of producing energy from one or more energy harvesters and transferring that energy to a power grid.

The rack 30 is a linear gear with teeth on two surfaces thereof. The teeth may be on opposing surfaces of the gear; however, the present invention is not limited in this regard as the teeth may be positioned on adjacent surfaces of the gear or even on the same surface of the gear. Movement of the rack 30 drives pinion gears 35 and 40, which in turn drive a power capture gear box and generator 85. The pinion gear 35 is clutched so that the power capture gear box and generator 85 is driven on the down stroke of the Magnus rotor 5, and the pinion gear 45 is clutched so that the power capture gear box and generator 85 is driven on the upstroke of the Magnus rotor 5. The power capture gearbox and generator 85 is electrically connected to a battery 400, as shown in FIG. 13, and the output of the generator is used to charge the battery. The electrical energy generated by the power capture gearbox and generator 85 is stored in the battery 400 until it is used by the network that it is linked into. Rack 30 and gears 35 and 40 can also be replaced with any mechanical device which converts linear motion into rotary motion such as a crank shaft.

Figure 6:
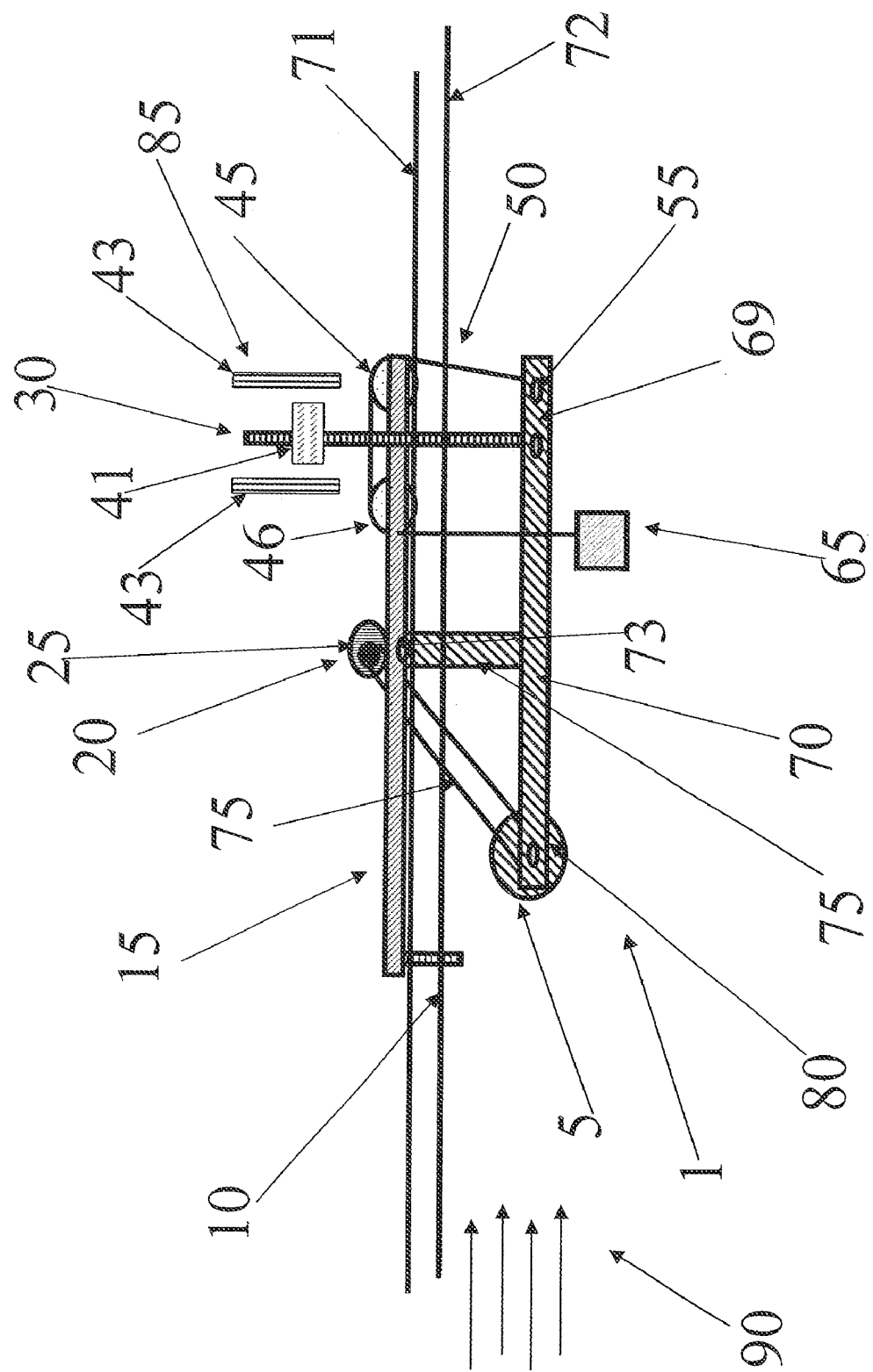
FIG. 6 is a schematic illustration of a sided view of an energy harvester that utilizes a magnet passing through a coil to generate electrical current.

Referring now to FIG. 6, an alternative generator that could be used in any embodiment of the energy harvester is shown. This generator utilizes a magnet 41 placed on any suitable surface of the energy harvester 1. The movement of the Magnus rotor 5 causes the magnet 41 to pass through a coil 43 to generate a current. This eliminates the use of the gearbox and the conversion of the motion into a rotary motion to drive a generator and accordingly increases the efficiency.

In any embodiment, the counterweight 65 can be replaced with any balancing mechanism such as a hydraulic or pneumatic cylinder, spring, or a reverse-oriented Magnus rotor which could be engaged to drive the forward-oriented Magnus rotor down when it is stopped. In such an embodiment, the return Magnus cylinder would be stopped when the forward cylinder is returned to the starting position.

Figure 1:
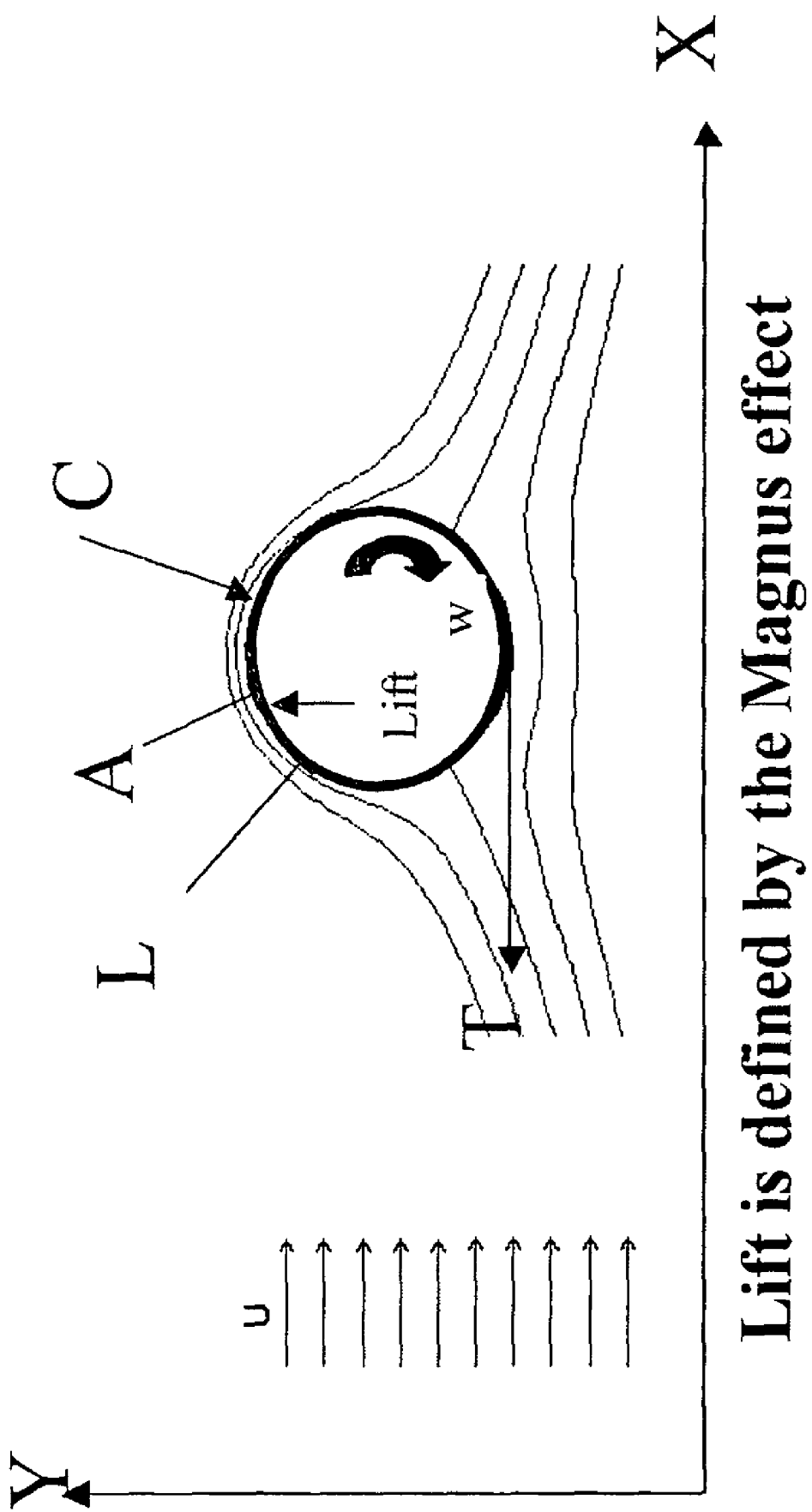
FIG. 1 is a schematic representation of a Magnus rotor showing lift of the rotor relative to a fluid flow.
Figure 2:
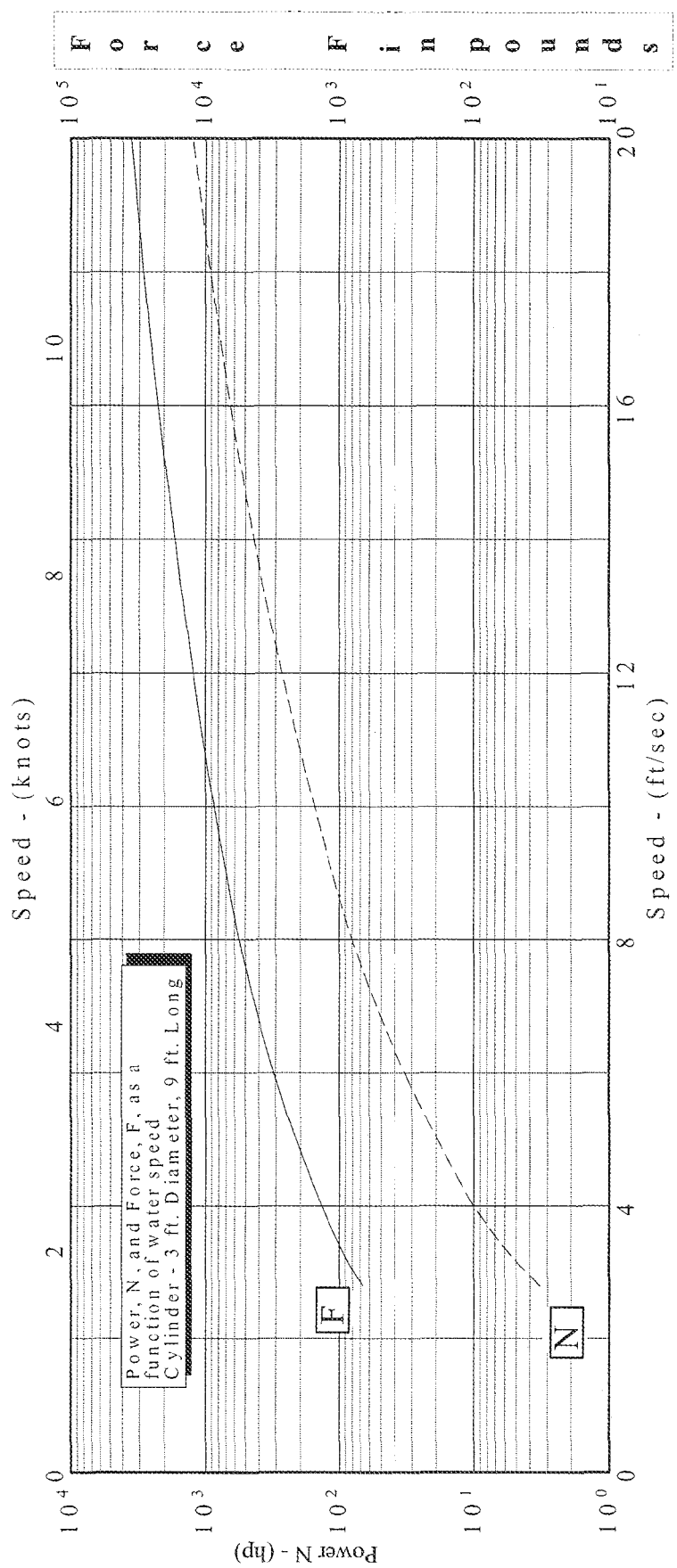
FIG. 2 is a graphical representation of force and horse power derived from one configuration of a Magnus rotor.
Figure 18:
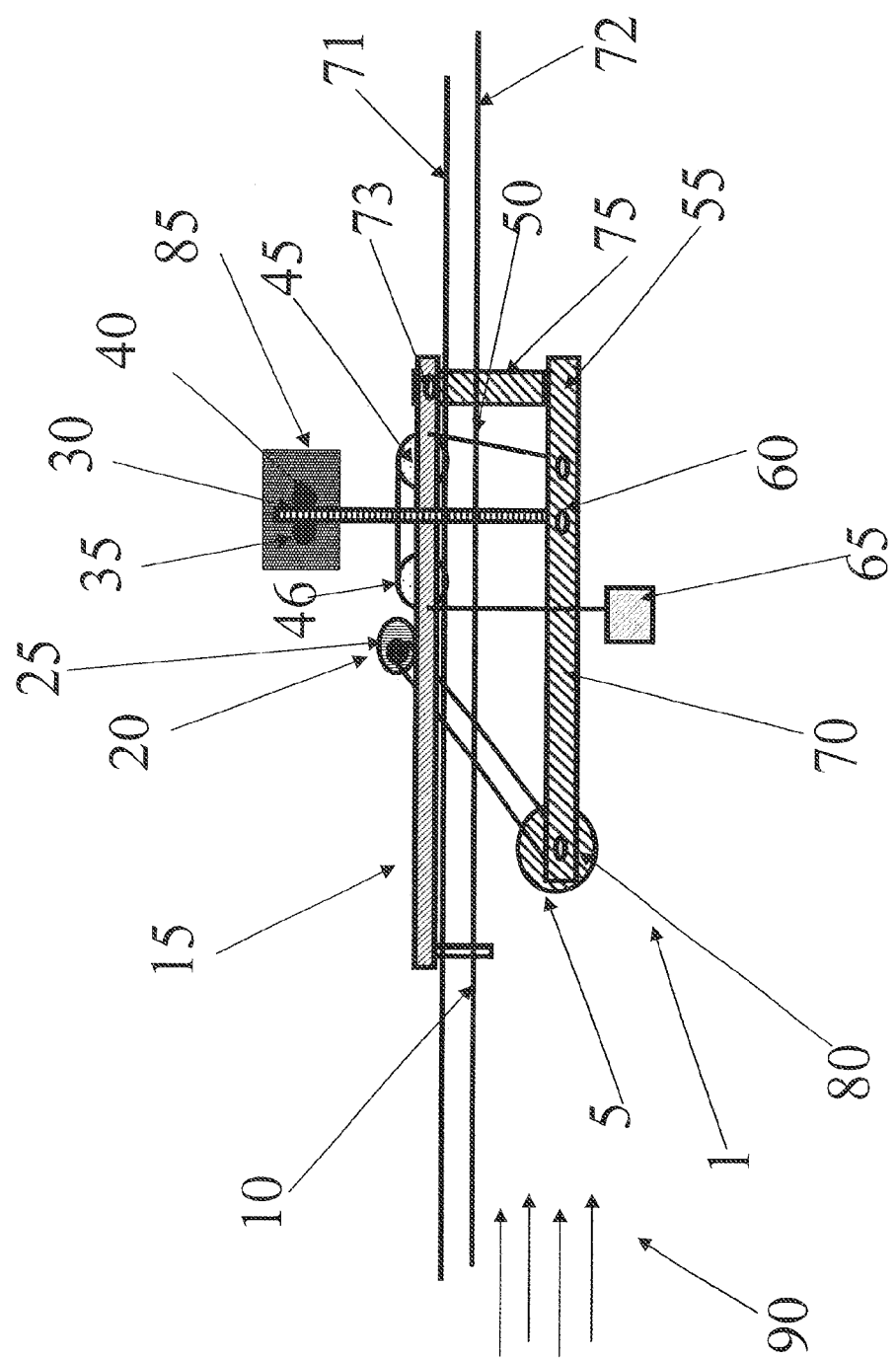
FIG. 18 is a schematic illustration of a side view of mechanical hydraulic energy harvester in the down position showing the difference in flotation level for a wave action generator versus a current action generator.

In embodiments using a gearbox, an increase of force inputted into the capture gearbox and generator 85 means that a bigger generator could be driven. The amount of force used as input for the power capture gearbox and generator 85 can be achieved by the embodiments described herein by modifying various variables. For example, from FIG. 1, the rotational speed T can be modified by adjusting the drive motor 20 speed or the pinion 25 and/or the pinion 26, thereby producing an increased speed that will result in increased lift that further translates into increased force. Also, the diameter of the Magnus rotor 5 can be increased in diameter to increase lift, thereby increasing speed and resulting in increased lift which translates into increase force. Furthermore, the length (shown at 91) of the cylinder of the Magnus rotor 5 in FIG. 5 can be adjusted. The longer the length 91 is, the greater the lift that is produced from the flow, so by increasing the length 91 the force is increased. Moreover, the pivot point 73 as shown in FIGS. 3 and 4 can be moved on the frame 69 so that it is located more towards the pulley 45 on support 15. By moving the pivot point, an increased amount of force can be delivered to the power capture gearbox and generator 85. Also, the pivot 73 could be relocated as shown in FIG. 18 to result in a higher force being applied to the power capture gearbox and generator 85.

If the fluid flow 90 is reversed similar to that found in a tidal basin where the tide comes in and goes out, the lift generated by the Magnus rotor 5 will be in the opposite direction desired. To generate power in both directions of flow 90, the Magnus rotor 5 can be reversed by changing the direction of the drive motor 20 to maintain the lift in the same direction so as to drive the reciprocating mechanism so that it continues to create power.

Figure 7:
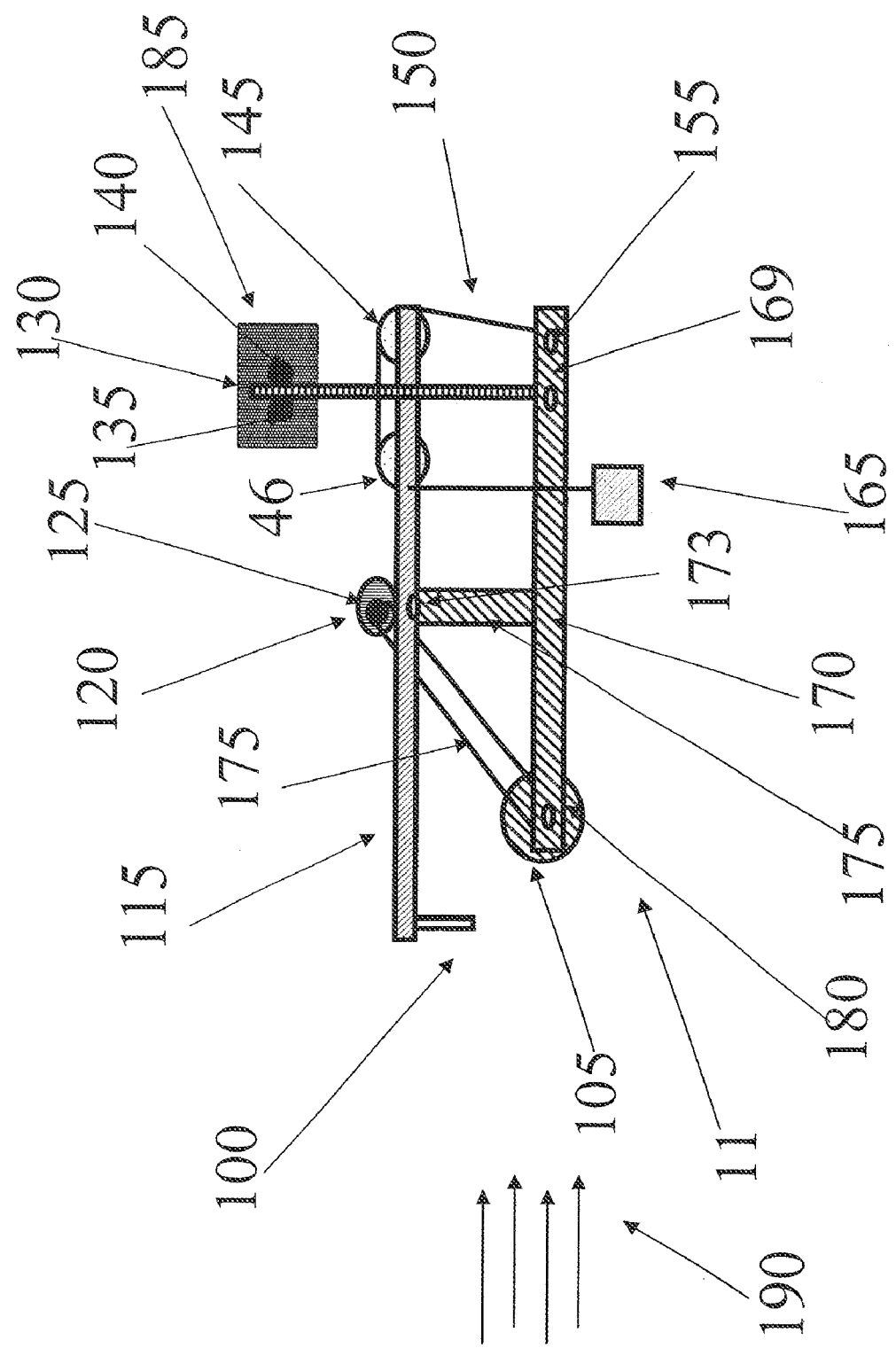
FIG. 7 is a schematic illustration of a side view of a wind driven energy harvester in the down position.
Figure 8:
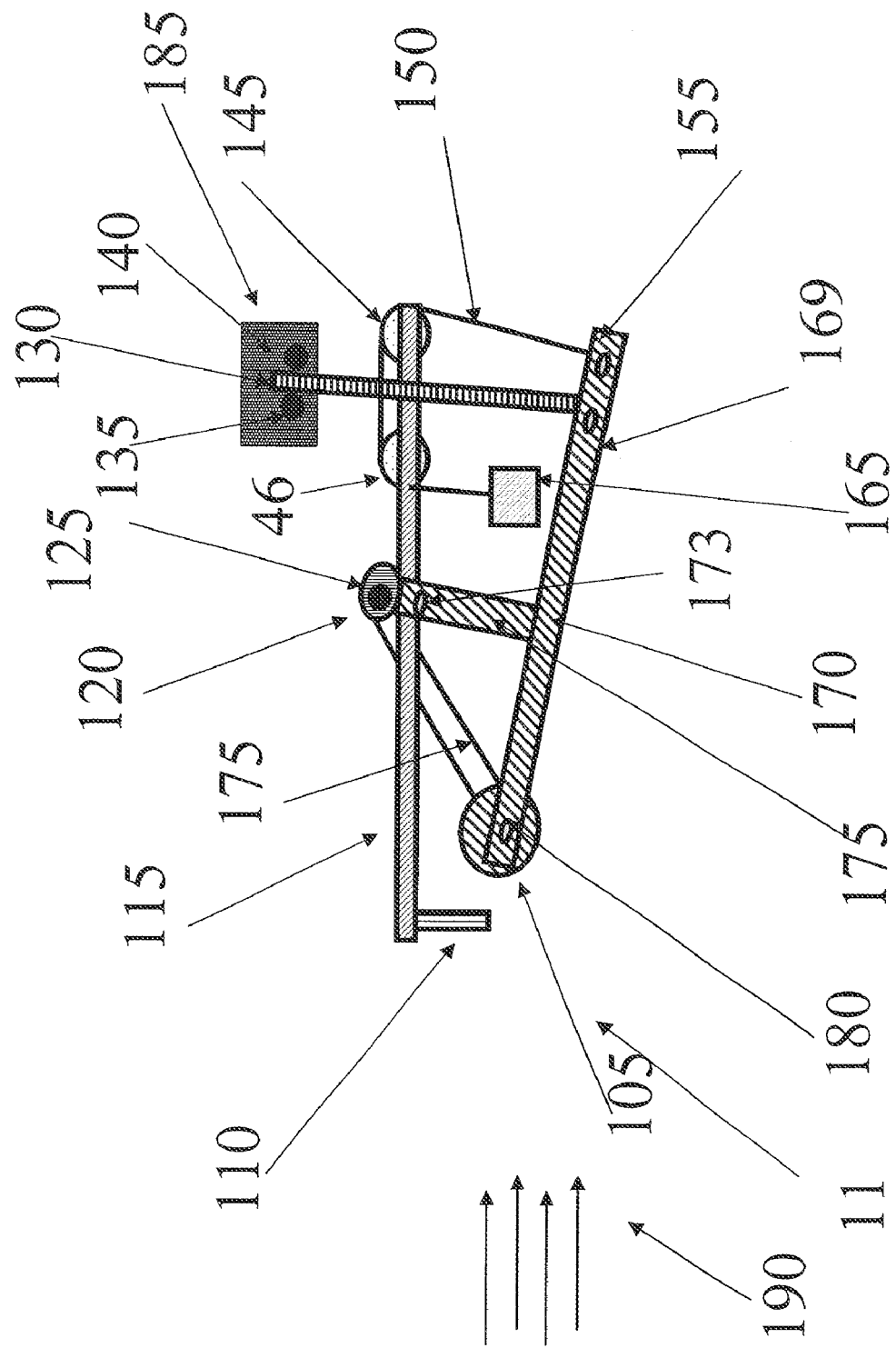
FIG. 8 is a schematic illustration of a side view of the wind driven energy harvester of FIG. 7 in the up position.
Figure 9:
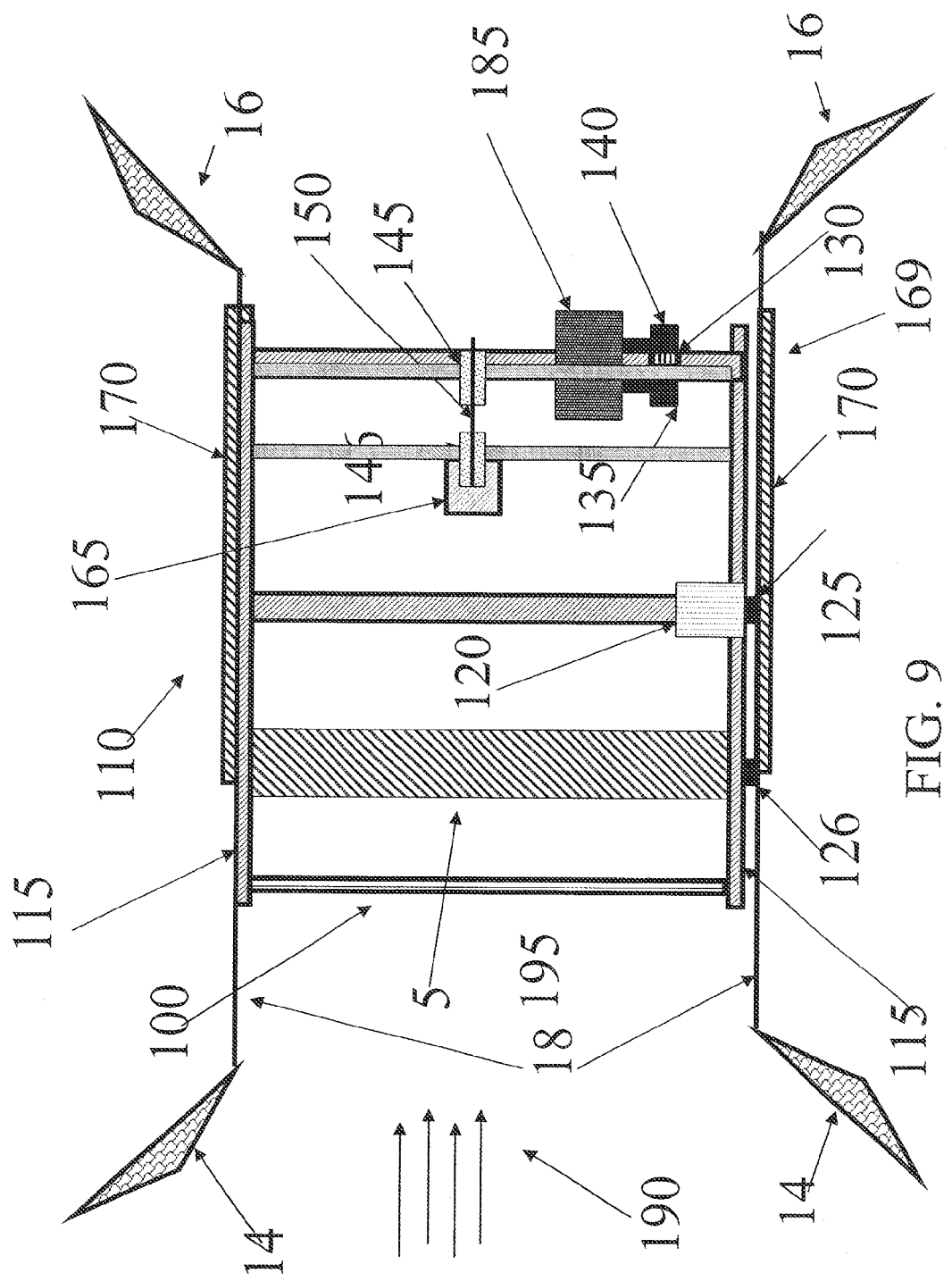
FIG. 9 is a schematic illustration of the top view of the wind driven energy harvester of FIG. 7.

An energy harvester 11 for use in air or pneumatic flows according to the present invention is shown in FIGS. 7, 8, and 9. The energy harvester 11 comprises inflow and outflow fluid channels 114, 116, channel side walls 118 (shown on FIG. 9), and a working Magnus rotor 105. The Magnus rotor 105 is mounted inside a passage 195 formed by the inflow fluid channels 114 and the channel side walls 118 or ductwork that approximates such structure. The outflow fluid channels 116 are located at the downstream end of this passage 195 to direct flow 190 out of the energy harvester 11. The Magnus rotor 105 is oriented transversely to the flow 190 through the passage 195 and is mounted for rotation, for example, via bearings 180 in side supports 170.

The Magnus rotor 105 is driven in rotation about an axle held in bearings 180 by a motor 120 that has a pinion 125 attached to the drive shaft of the motor, a belt 175, and a drive pinion 126 on the Magnus rotor 105. This motor 120 drives the Magnus rotor 105 so that it provides adequate rotation to generate lift when the flow 190 is concentrated through the channel 195. This concentrating of fluid in the channel 195 accelerates the flow by funneling the fluid towards the Magnus rotor 105, thereby increasing the lift.

Referring to FIGS. 7 and 8, fluid flow 190 in the direction as indicated by the arrows, along the channel 195, causes the Magnus rotor 105 to raise up towards support 170 thereby rotating a frame 169 comprised of the rotor support 170 and a rotor support arm 175 about a pivot 173 in the direction up towards support 115. Rotation of the frame 169 about the pivot 173 causes the leading edge of the frame to rotate (up) toward the support 115 while correspondingly causing the trailing edge of the frame to rotate (down) in the direction away from the support. A counterweight 165 is attached to the rotor support 170 by a pin 155 and a cable 150. The counterweight 165 utilizes a counterbalancing method, although any suitable counterbalance could be used. The cable 150 is guided in pulleys 145 and 146 rotatably mounted to a support structure such as a barge, a floating platform, or the like.

During operation of the energy harvester 11, once the Magnus rotor 105 moves into a position behind the stall baffle 100 (relative to the direction of the flow 190), the flow is impeded and the motor 120 is stopped. The stopping of motor 120 combined with the impeded flow permits the stored energy in the counterweight 165 to return the frame 169 and the Magnus rotor 105 to the lower position where the motor 120 is restarted to re-initiate rotation of the Magnus rotor, thereby providing lift and starting the process over again. The present invention is not limited to the use of a counterweight 165 to return the frame 169 to the lower position, however, as the motor 120 could be reversed to drive the Magnus rotor 105 down into the lower position as shown in FIG. 7.

Power is extracted from the operation of the energy harvester 11 on both the upward and the downward movements of the frame 169 via a rack 130 attached to the frame. When the frame 169 (and the Magnus rotor 105) are lifted, the rack 130 is driven so that one or more gears is rotated so power is extracted on the upstroke. When the frame 169 (and the Magnus rotor 105) are lowered, one or more gears is rotated so power is extracted on the downstroke.

The rack 130 is a linear gear with teeth on two surfaces thereof. The teeth may be on opposing surfaces of the gear; however, the present invention is not limited in this regard as the teeth may be positioned on adjacent surfaces of the gear or even on the same surface of the gear. Movement of the rack 130 drives pinion gears 135 and 140, which in turn drive a power capture gear box and generator 185. The pinion gear 135 is clutched so that the power capture gear box and generator 185 is driven on the down stroke of the Magnus rotor 105, and the pinion gear 145 is clutched so that the power capture gear box and generator 185 is driven on the upstroke of the Magnus rotor 105. The power capture gearbox and generator 185 is electrically connected to a battery 400, as shown in FIG. 13, and the output of the generator is used to charge the battery. The electrical energy generated by the power capture gearbox and generator 185 is stored in the battery 400 until it is used by a network that it is linked into. An alternative generator that could be used is one in which a magnet is placed on the moving energy harvester 11 and passed through a coil so as to generate a current. This eliminates the conversion of the motion into a rotary motion to drive a generator and increases the efficiency. The counterweight 165 can be replaced with any balancing mechanism such as a hydraulic or pneumatic cylinder, spring, or a reverse-oriented Magnus rotor which could be engaged to drive the forward-oriented Magnus rotor down when it is stopped. In such an embodiment, the return Magnus cylinder would be stopped when the forward cylinder is returned to the starting position.

An increase of force inputted into the capture gearbox and generator 85 means that a bigger generator could be driven. The amount of force used as input for the power capture gearbox and generator 185 can be achieved by the embodiments described herein by modifying various variables. For example, from FIG. 1, the rotational speed T can be modified by adjusting the drive motor 120 speed or the pinion 125 and/or the pinion 126, thereby producing an increased speed that will result in increased lift that further translates into increased force. Also, the diameter of the Magnus rotor 105 can be increased in diameter to increase lift, thereby increasing speed and resulting in increased lift which translates into increase force. Furthermore, the length of the cylinder of the Magnus rotor 5 can be adjusted. The longer the length is, the greater the lift that is produced from the flow, so by increasing the length the force is increased. Moreover, the pivot point 173 as shown in FIGS. 7 and 8 can be moved on the frame 169 so that the pivot 173 is located on more towards the pulley 145 on support 115. By moving the pivot 173, an increased amount of force can be delivered to the power capture gearbox and generator 185. Also, the pivot 173 could be relocated (as shown at 73 in FIG. 18) to result in a higher force being applied to the power capture gearbox and generator 85. The gearbox 85, rack 130 and gears 135 and 140 can also be replaced with any mechanical device that converts linear motion into rotary motion such as a crankshaft.

If the fluid flow 190 is reversed similar to that found in a tidal basin where the tide comes in and goes out, the lift generated by the Magnus rotor 105 will be in the opposite direction desired. To generate power in both directions of flow 190, the Magnus rotor 105 can be reversed by changing the direction of the drive motor 120 to maintain the lift in the same direction, thereby driving the rack 130 so that power is generated.

Figure 10:
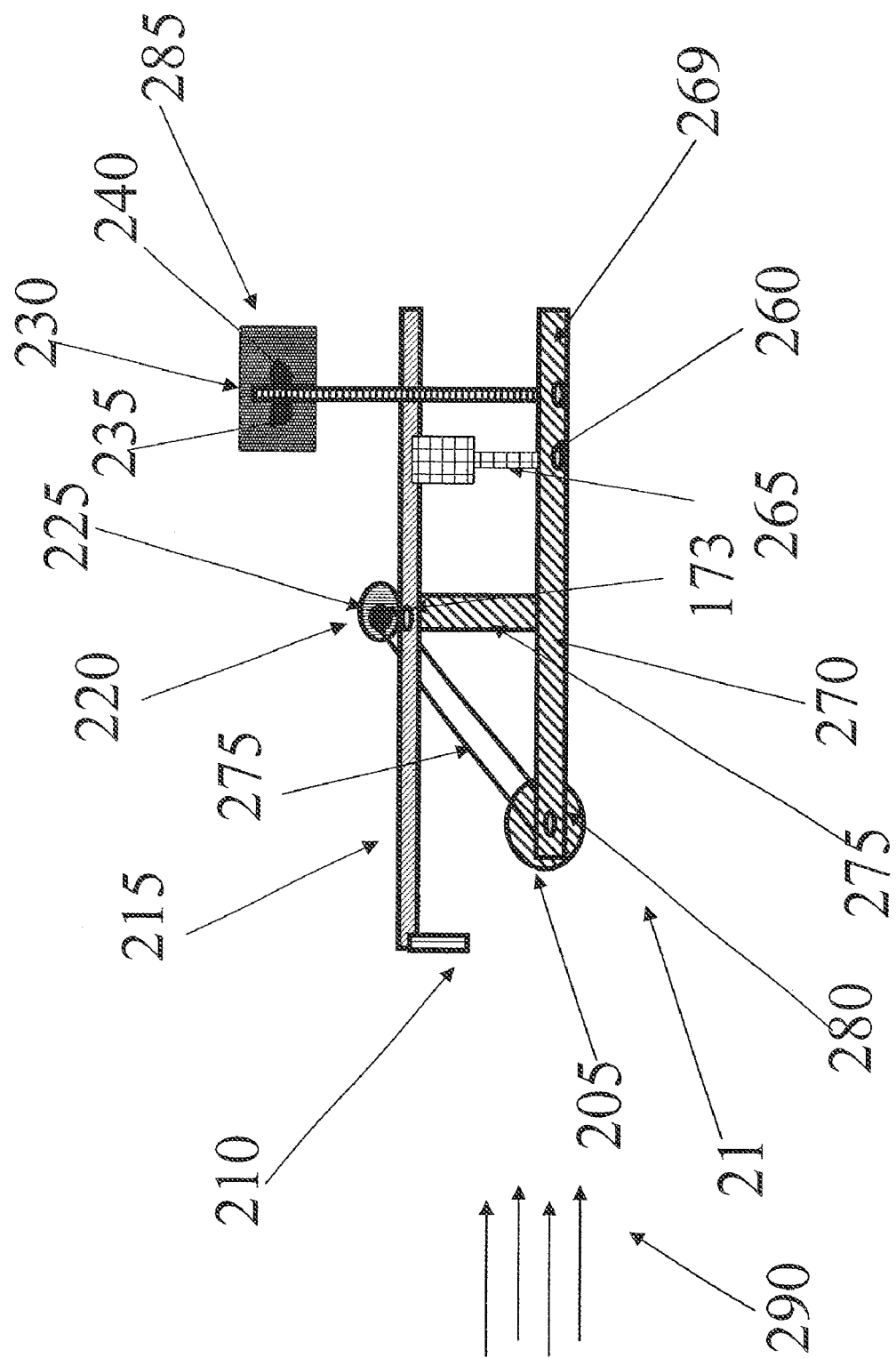
FIG. 10 is a schematic illustration of a side view of a hydraulic energy harvester designed for use in building piping systems in the down position.
Figure 11:
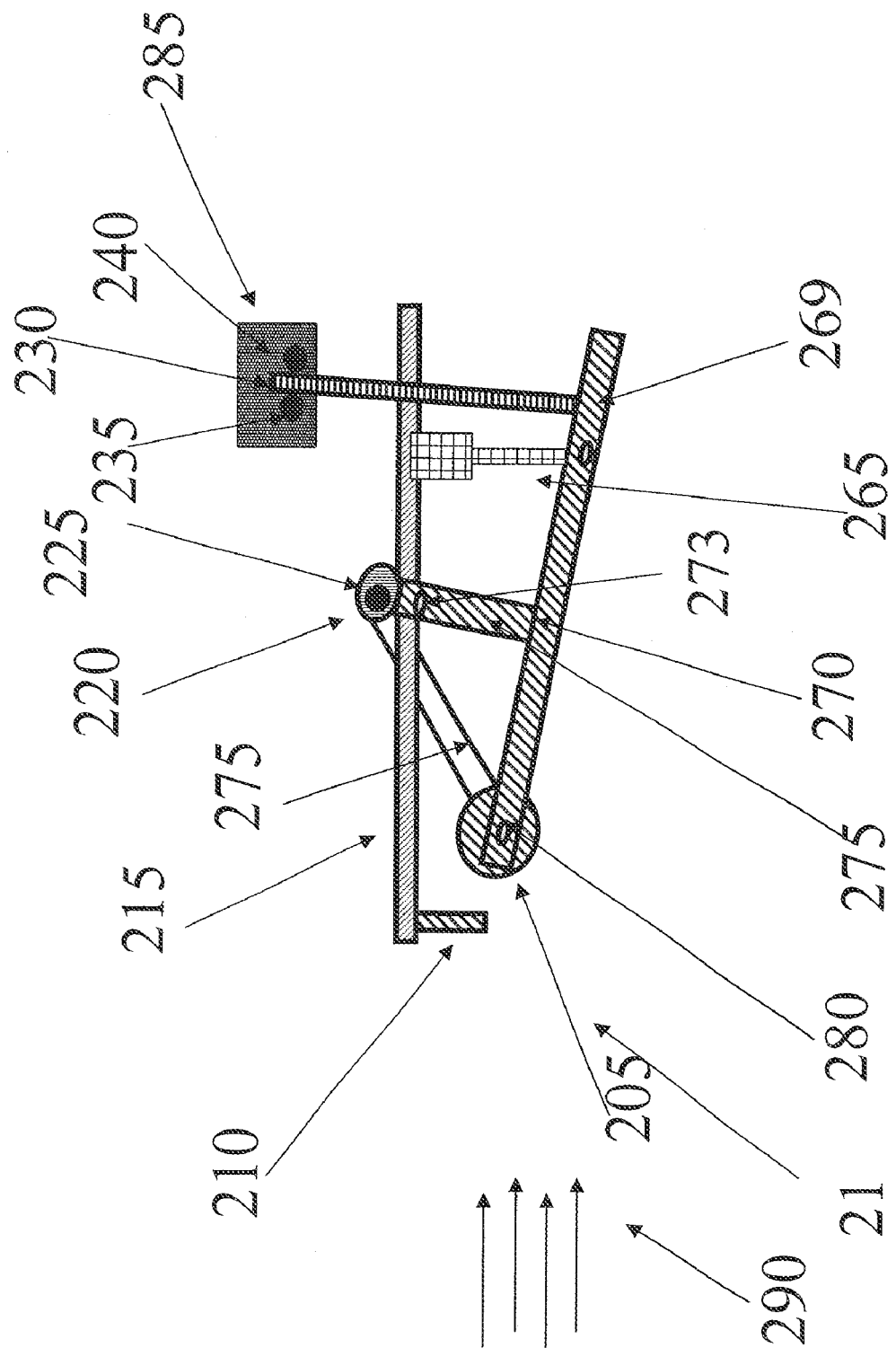
FIG. 11 is a schematic illustration of a side view of the hydraulic energy harvester of FIG. 10 in the up position.
Figure 12:
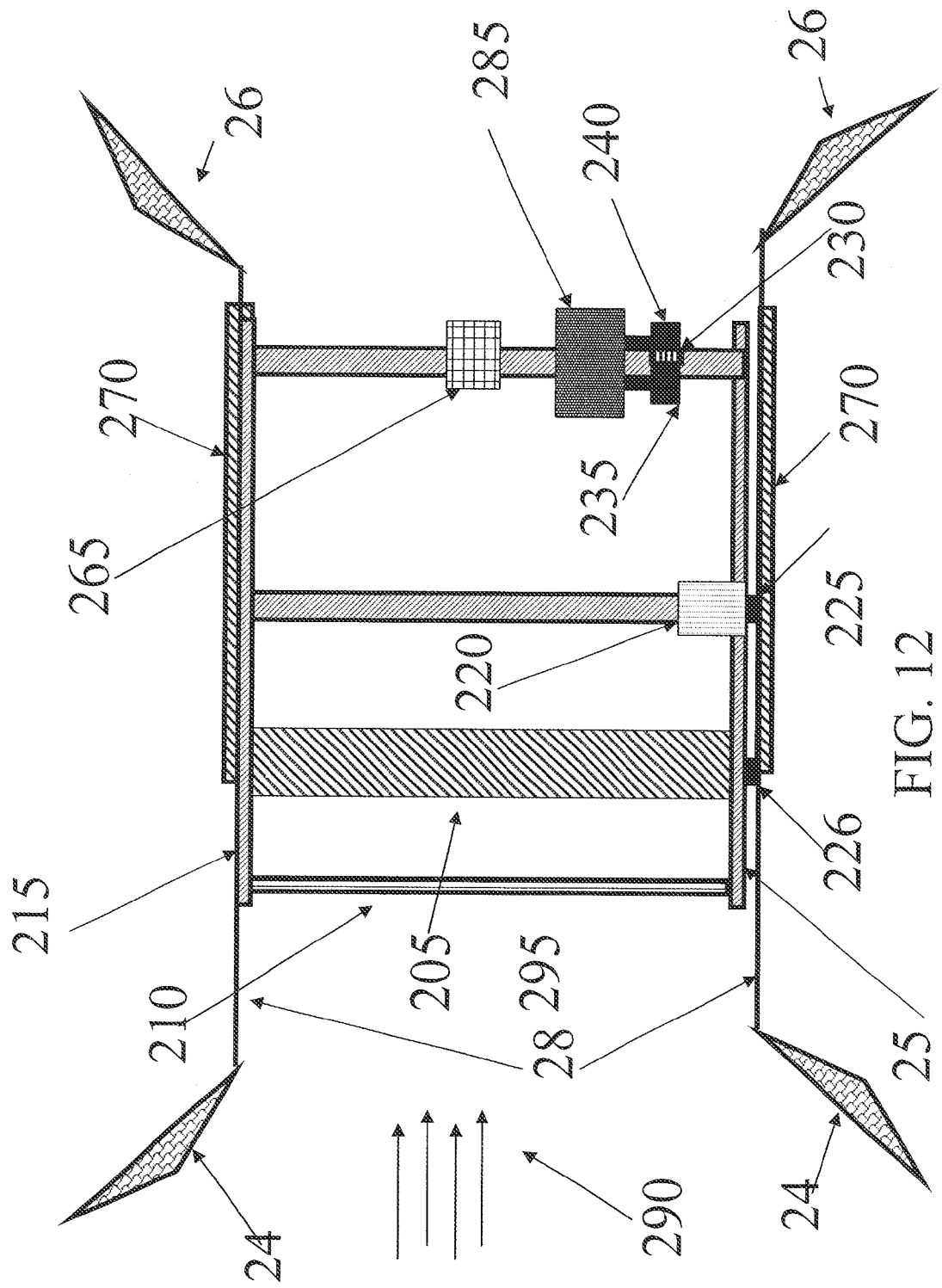
FIG. 12 is a schematic illustration of a top view of the hydraulic energy harvester of FIG. 10.

An energy harvester 21 for use in building outflows such as effluent lines connected to sewers, water treatment facilities, water drains, holding ponds, holding tanks, lagoons, roofing drains, air conditioning lines, and the like for either pneumatic or hydraulic flows according to the present invention is shown as a system in FIGS. 10, 11, and 12. The energy harvester 21 comprises inflow and outflow fluid channels 214, 216, channel side walls 218 (shown on FIG. 12), and a working Magnus rotor 205. The Magnus rotor 205 is mounted inside a passage 295 formed by the inflow fluid channels 214 and the channel side walls 218 or ductwork that approximates such structure. The outflow fluid channels 216 are located at the downstream end of this passage 295 to direct flow 290 out of the energy harvester 21. The Magnus rotor 205 is oriented transversely to the flow 290 through the passage 295 and is mounted for rotation, for example, via bearings 280 in side supports 270.

The Magnus rotor 205 is driven in rotation about an axle held in bearings 280 by a motor 220 that has a pinion 225 attached to the drive shaft of the motor, belt 275, and a drive pinion 226 on the Magnus rotor 205. This motor 220 drives the Magnus rotor 205 so that it provides adequate rotation to generate lift when the flow 290 is concentrated through the channel 295. This concentrating of fluid in the channel 295 accelerates the flow by funneling the fluid towards the Magnus rotor 205, thereby increasing the lift.

Referring to FIGS. 10 and 11, fluid flow 290 in the direction as indicated by the arrows received from a source of fluid via an outflow line and along the channel 295 causes the Magnus rotor 205 to raise up towards support 270 thereby rotating a frame 269 comprised of the rotor support 270 and a rotor support arm 275 about a pivot 273 in the direction up towards support 215. Rotation of the frame 269 about the pivot 273 causes the leading edge of the frame to rotate (up) toward the support 215 while correspondingly causing the trailing edge of the frame to rotate (down) in the direction away from the support. A balancing mechanism which can be a hydraulic or pneumatic cylinder 265 is attached to the rotor support 270 by a pin. However, the present invention is not limited in this regard, as any suitable counterbalance could be used. Also, the energy harvester 21 is not limited to being located in an outflow line from a source of fluid, as it may be located in an inflow line (e.g., a line from a well, public water system, river or other source of liquid into a plant, a holding tank, or the like).

During operation of the energy harvester 200, once the Magnus rotor 205 moves into a position behind the stall baffle 210 (relative to the direction of the flow 290), the flow is impeded and the motor 220 is stopped. The stopping of motor 220 combined with the impeded flow permits the stored energy in the counterweight 265 to return the frame 269 and the Magnus rotor 205 to the lower position where the motor 220 is restarted to re-initiate rotation of the Magnus rotor, thereby providing lift and starting the process over again. The present invention is not limited to the use of a counterweight 265 to return the frame 269 to the lower position, however, as the motor 220 could be reversed to drive the Magnus rotor 205 down into the lower position as shown in FIG. 10.

Power is extracted from the operation of the energy harvester 21 on both the upward and the downward movements of the frame 269 via a rack 230 attached to the frame. When the frame 269 (and the Magnus rotor 205) are lifted, the rack 230 is driven so that one or more gears is rotated so power is extracted on the upstroke. When the frame 269 (and the Magnus rotor 205) are lowered, one or more gears is rotated so power is extracted on the downstroke.

The rack 230 is a linear gear with teeth on two surfaces thereof. The teeth may be on opposing surfaces of the gear; however, the present invention is not limited in this regard as the teeth may be positioned on adjacent surfaces of the gear or even on the same surface of the gear. Movement of the rack 230 drives pinion gears 235 and 240, which in turn drive a power capture gear box and generator 285. The pinion gear 235 is clutched so that the power capture gear box and generator 285 is driven on the down stroke of the Magnus rotor 205, and the pinion gear 245 is clutched so that the power capture gear box and generator 285 is driven on the upstroke of the Magnus rotor 205. Rack 230 and gears 235 and 240 can also be replaced with any mechanical device which converts linear motion into rotary motion such as a crank shaft. The power capture gearbox and generator 285 is electrically connected to a battery 400, as shown in FIG. 13, and the output of the generator is used to charge the battery. The electrical energy generated by the power capture gearbox and generator 285 is stored in the battery 400 until it is used by the network that it is linked into. The term "electrical network" refers to any system used to utilize or transport electrical current.

An alternative generator that could be used is to place a magnet on the moving energy harvester 210 and pass it through a coil so as to generate a current, as described above. This eliminates the use of the gearbox and the conversion of motion into a rotary motion to drive a generator and increases the efficiency.

In any embodiment described herein, the balancing mechanism 265 can be replaced with any balancing mechanism such as (as is shown) a hydraulic or pneumatic cylinder, a spring, or a reverse-oriented Magnus rotor which could be engaged to drive the forward-oriented Magnus rotor down when it is stopped. In such an embodiment, the return Magnus cylinder would be stopped when the forward cylinder is returned to the starting position.

An increase of force inputted into the capture gearbox and generator 285 means that a bigger generator could be driven. The amount of force used as input for the power capture gearbox and generator 285 can be achieved by the embodiments described herein by modifying various variables. For example, from FIG. 1, the rotational speed T can be modified by adjusting the drive motor 220 speed or the pinion 225 and/or the pinion 226, thereby producing an increased speed that will result in increased lift that further translates into increased force. Also, the diameter of the Magnus rotor 205 can be increased in diameter to increase lift, thereby increasing speed and resulting in increased lift which translates into increase force. Furthermore, the length of the cylinder of the Magnus rotor 205 can be adjusted. The longer the length is, the greater the lift that is produced from the flow, so by increasing the length the force is increased. Also the pivot could be relocated (as shown at 73 in FIG. 18) to result in a higher force being applied to the power capture gearbox and generator 85.

If the fluid flow 290 is reversed similar to that found in a tidal basin where the tide comes in and goes out, the lift generated by the Magnus rotor 205 will be in the opposite direction desired. To generate power in both directions of flow 290, the Magnus rotor 205 can be reversed by changing the direction of the drive motor 220 to maintain the lift in the same direction so as to drive the mechanism so that it continues to create power.

Figure 14:
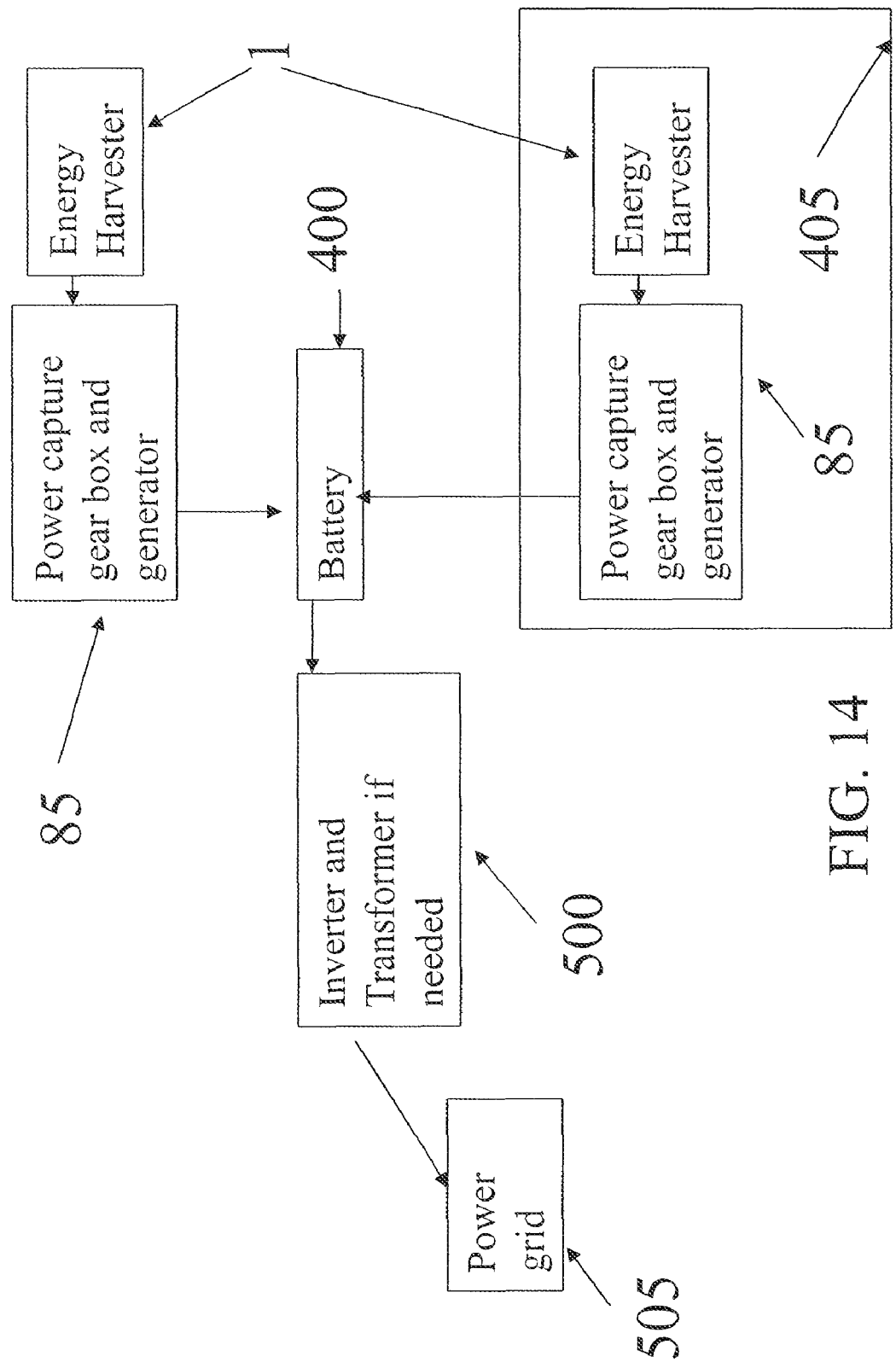
FIG. 14 is a block diagram of a process of producing energy from one or more energy harvesters feeding a single battery bank and transferring that energy to a power grid.
Figure 15:
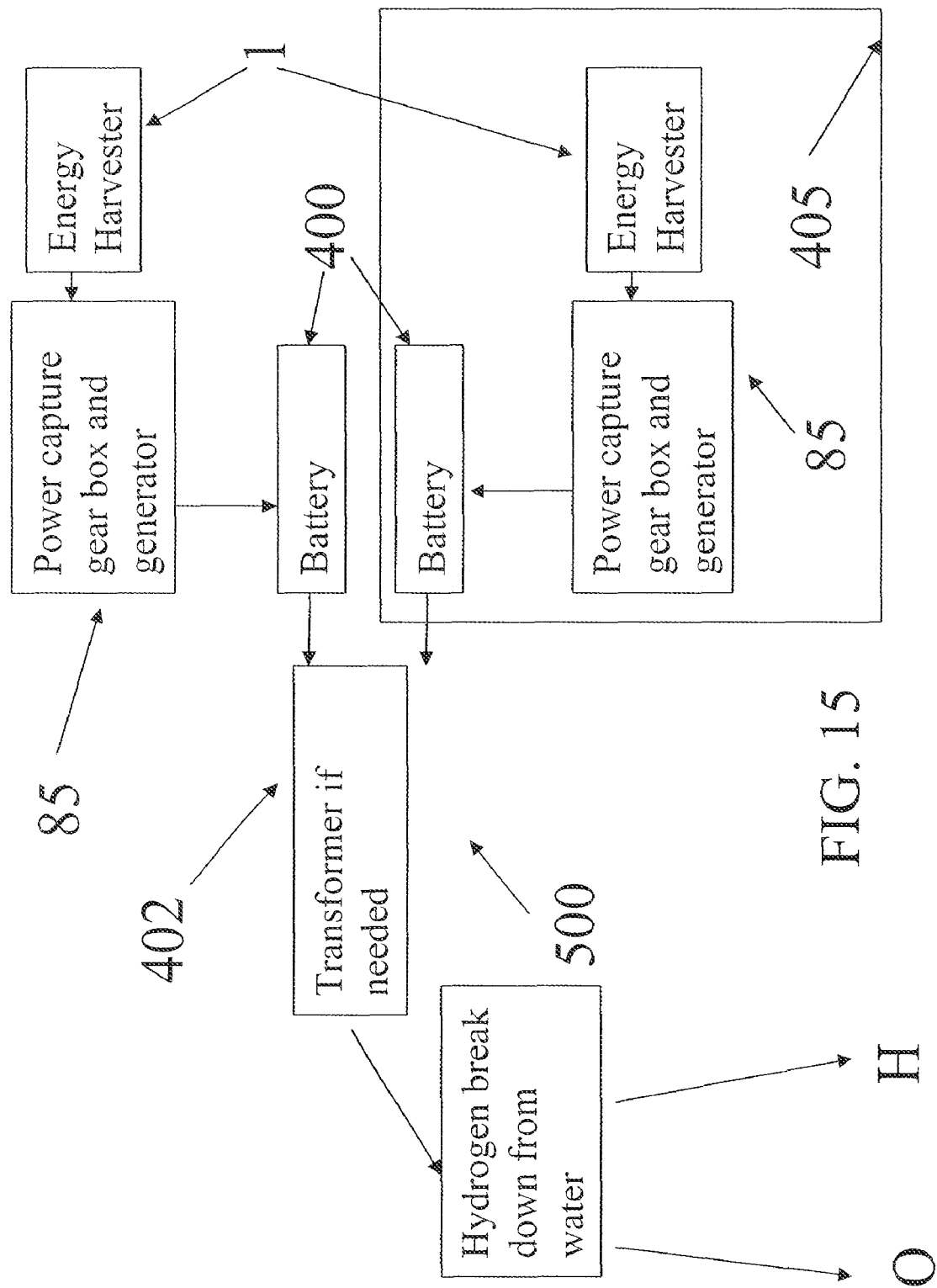
FIG. 15 is a block diagram of a process of transferring power from one or more energy harvesters for producing hydrogen and oxygen.

Referring now to FIGS. 13 and 14, the process of producing energy from one or more energy harvesters and transferring that energy to a power grid is shown generally at 500. In the process 500, the energy harvester 1 produces energy by mechanical pumping and driving the power capture gearbox and generator 85 which charges the battery 400. More than one battery bank 400 is shown in FIG. 13, whereas in FIG. 14 only one battery bank is shown. Process 500 is not limited to the incorporation of energy harvester 1, however, as any of the other energy harvesters shown in FIGS. 3-12 may be utilized. Once the battery 400 is charged, it can be discharged to a power grid 505 by using an inverter and/or transformer 402 to adjust the output to the correct voltage. The term "electrical grid" refers to any system used to utilize or transport electrical current. If the system utilizes more than one energy harvester they can be added to the battery charging side of the network as shown in an assembly 405 that comprises the energy harvester 1, the power capture gearbox and generator 85, and the battery 400. If direct current is required for power, then the inverter is not needed to transform direct current into alternating current and the transformer can be used to discharge the correct voltage as shown in FIG. 15. FIG. 15 also shows the power stored in batteries 400 used to create oxygen (O) and hydrogen (H) by breaking down water through electrolysis. The hydrogen or oxygen use individual outflow means such as a pipe to channel the gas so can be stored and used to power other energy producing devices such as fuel cells, stored for sale to others, used locally, or used in an internal combustion engine. The present invention is not limited in this regard, as the hydrogen and oxygen can be directed to other locations.

The energy harvester 1, 11 or 21 can be connected in any suitable manner to an electric generator 85 for generating electricity. The energy harvester could be connected to the generator by pulleys and cables, pulleys and belts, crank shafts, or other mechanical device(s) that convert reciprocating motion into rotary motion. Also the reciprocating motion could be used to generate electricity by using a linear motion generator similar to those designed by QM Power of Boston, Mass. This alternative generator is a magnet placed on the moving energy harvester (as described above), which passes through a coil to generate a current. This eliminates the conversion of linear motion into a rotary motion to drive a generator and increases the efficiency. More particularly, these devices take linear back and forth motion and generate DC or AC power depending on the desired output.

The energy harvester of the present invention is shown in FIGS. 3-12 in an application in which power may be generated from a water current flow having a sufficiently strong and, in many cases, reversible velocity of at least 1 foot per second. Using a configuration of the energy harvester as shown in FIG. 3, power may be generated in some tidal estuaries where there is no water head differential by reversing the rotation of the Magnus rotor 5 so as to generate lift from the rotor such that the lift rotates the frame 69 to rotate about the pivot 73 in the direction up towards support 15 with regard to the leading edge and down away from support 15 with regard to the trailing edge. In such a configuration, the motor 20 is preferably reversible so as to first come to a stop and then change direction to take advantage of the reversing flow.

Any of the foregoing embodiments of the invention as described above can also be used to extract energy from wave action. Referring now to FIG. 18, the device would be designed to produce energy from wave action by changing the level at which the energy harvester sits in the water. Normally the hydraulic water level is positioned for level 71. When wave energy is the driving force the energy harvester would sit higher in the water so that the water level is at level 72. For such a use, the position of the energy harvester 1 is adjusted via support 15 to accommodate the variations in water level.

The energy harvester 1 could be positioned from support 15 on each side of the energy harvester by attaching it to a bridge, an abutment, a floating barge, or building so that it was a self floating unit. When the energy harvester 1 is used in an effluent system that discharges to a sewer, holding lagoon, or other source, the energy harvester is submerged in the fluid flow. In one embodiment, the energy harvester is placed in a chamber in the effluent system that is specially designed to support the energy harvester.

In areas of flowing current such as a river or estuary, the velocity is greatest at the surface of the water and decreases to a minimum at the bottom. In a tidal estuary, the water level increases and decreases with the tides. In some areas, the water level fluctuations are substantial. In such areas, a fixed power generation installation cannot take advantage of the greatest velocity flow at the surface. To accommodate changes in water level fluctuations and the like, the energy harvester 1 of the present invention may be installed on a vessel. The vessel rises and falls with the fluctuating water level to facilitate the positioning of the energy harvester at the most suitable location (e.g., at the position in which the fluid flow is of greatest velocity).

Figure 16:
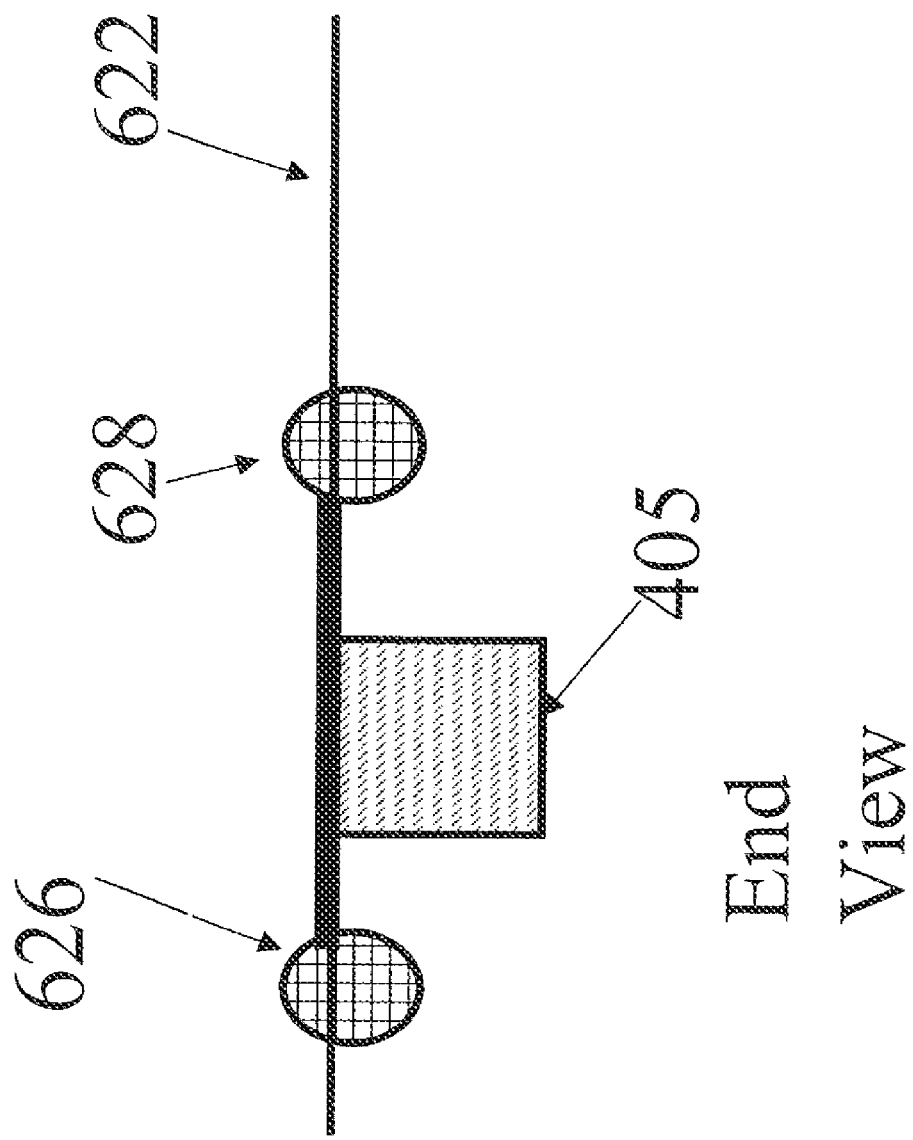
FIG. 16 is a schematic illustration of an end view of a hydraulic energy harvester assembly suspended from a catamaran for use with a fluctuating water level.
Figure 17:
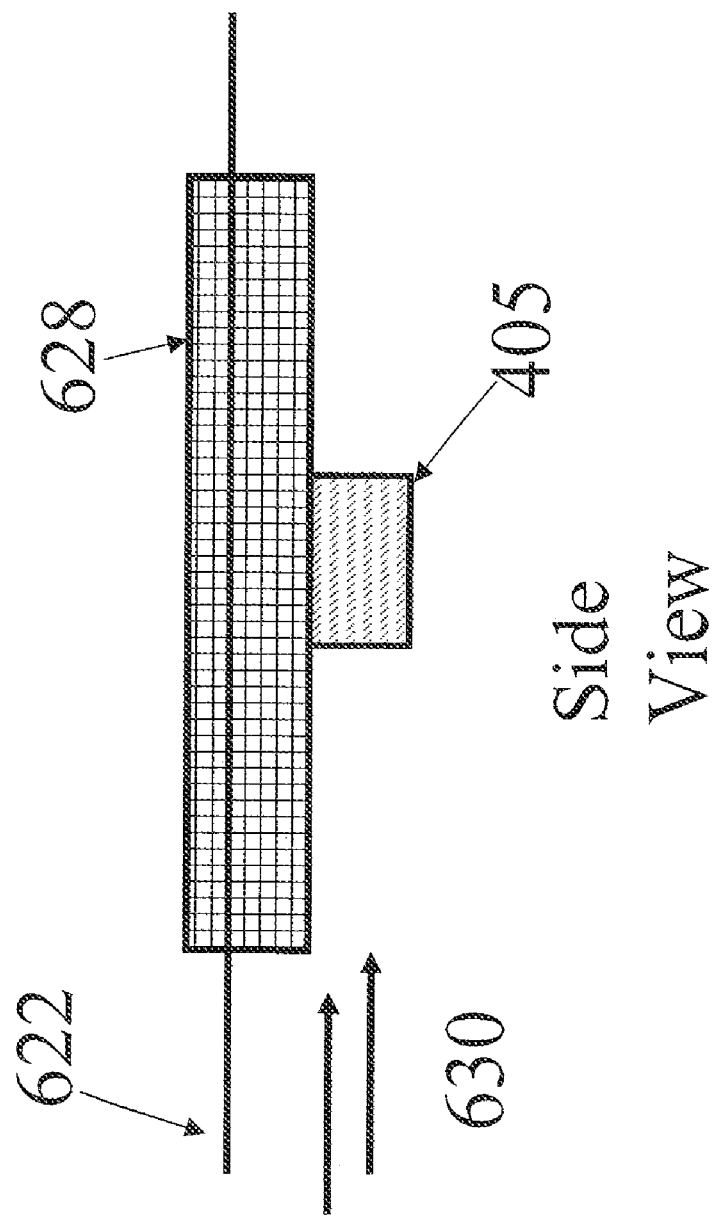
FIG. 17 is a schematic illustration of a side view of the assembly of FIG. 16.

A floating catamaran installation is shown in FIGS. 16 and 17. The present invention is not limited to the use of a catamaran, however, as any type of vessel may be used. An energy harvester assembly 405 according to the present invention, such as described in reference to any of the embodiments described above, is mounted to extend between two pontoons or hulls 626, 628 of the catamaran and is oriented perpendicularly to the current flow, illustrated by arrows 630. The assembly 405 is mounted just below the surface of the water 622, so that the entire assembly is submerged. Water flows past the assembly 405 and power is generated as discussed above.

Figure 19:
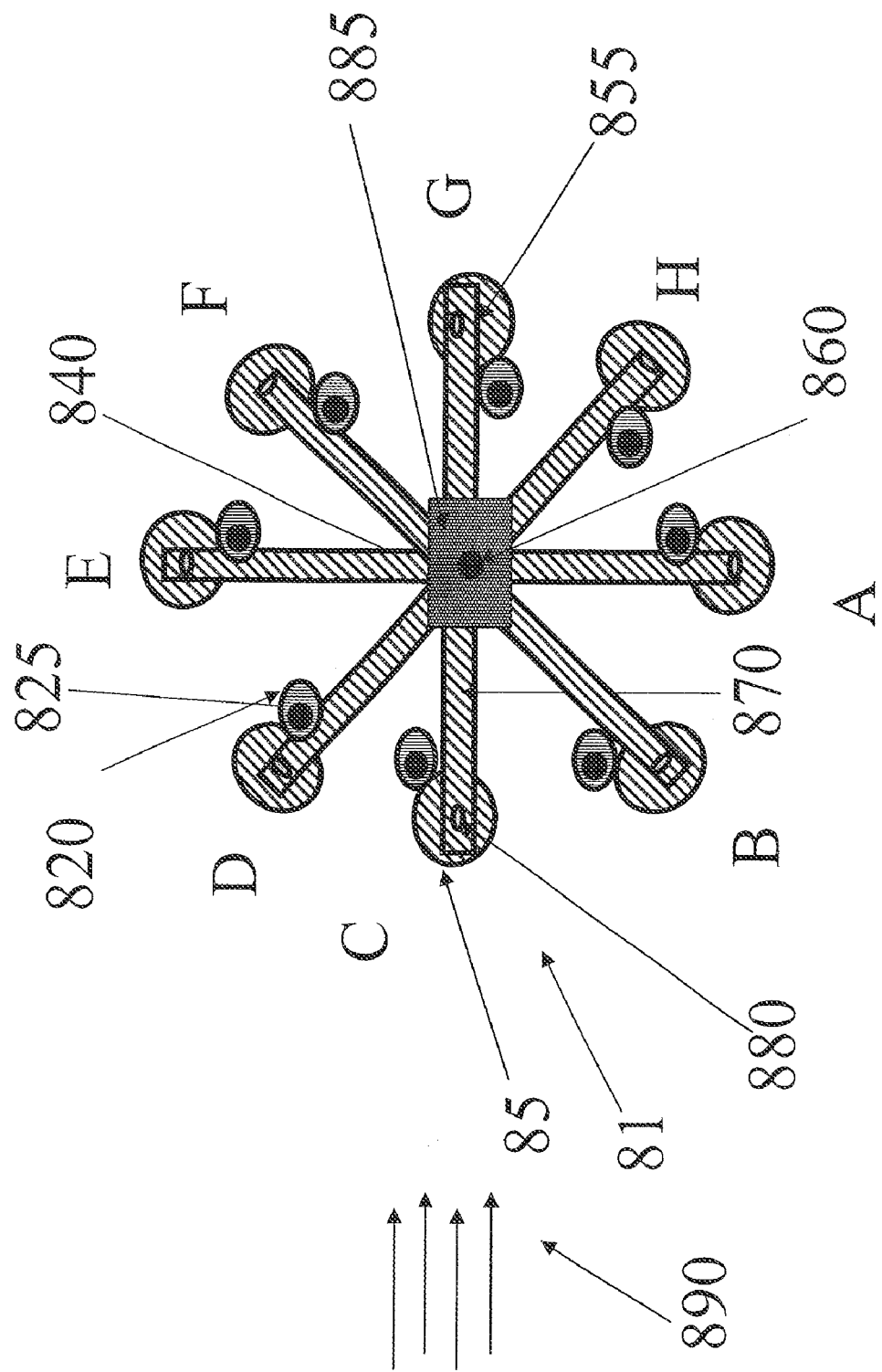
FIG. 19 is a schematic illustration of a side view of a rotating Magnus generator.
Figure 20:
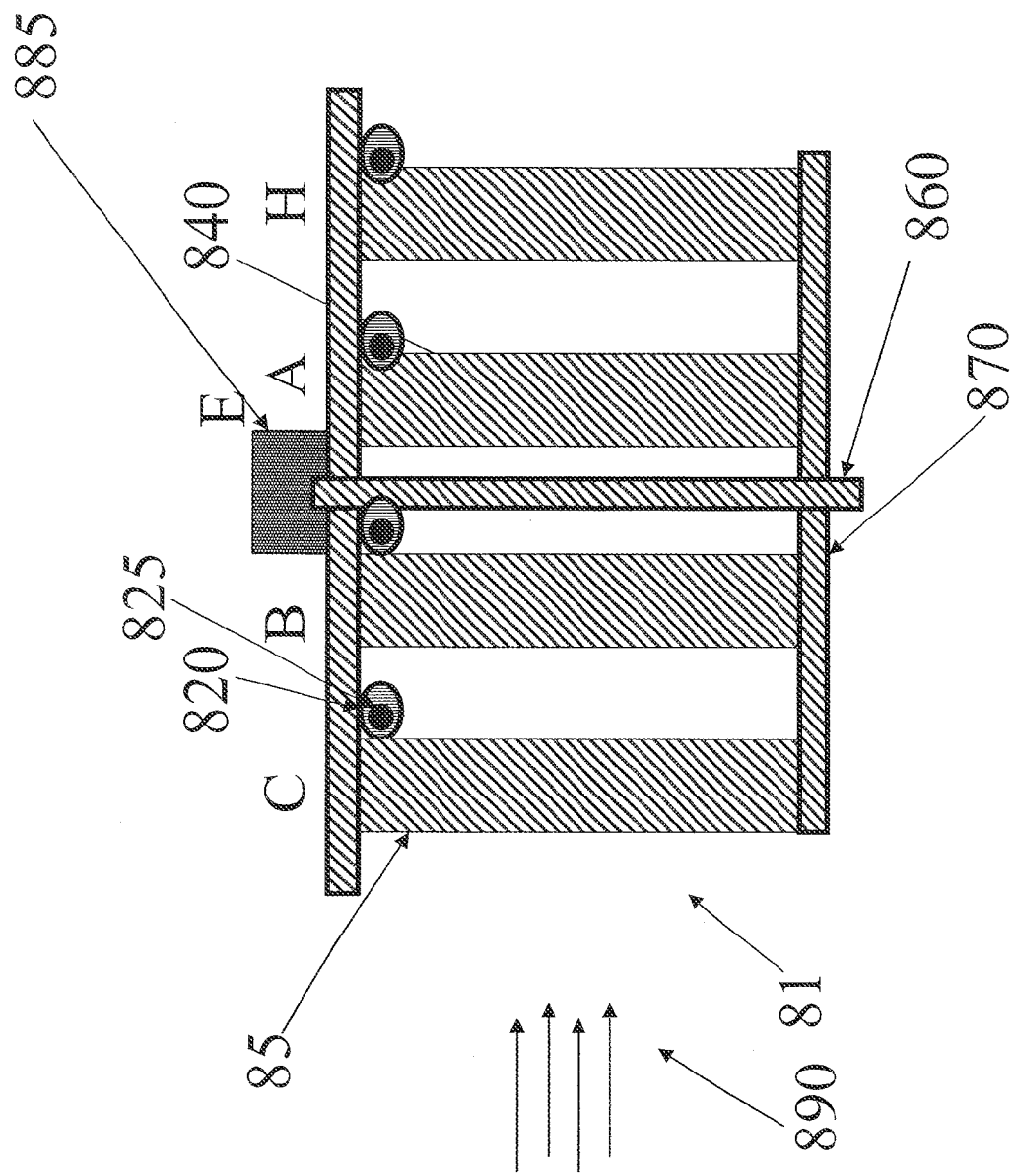
FIG. 20 is a schematic illustration of a top view of the rotating Magnus generator of FIG. 19.

Referring now to FIGS. 19 and 20, a rotary energy harvester is shown generally at 81. One objective of the rotary energy harvester 81 is to use the Magnus rotors to generate a rotary motion that can be used to drive a rotary generator. Positions A through H are shown only for reference because the Magnus rotors 85 travel in a complete circle about a central axis 860 located transverse (and preferably vertically) to the direction of fluid flow 890. Frames 870 extend radially from the central axis 860 and are evenly spaced from each other. Magnus rotors 85 are connected to the frames 870. Rotation of the cylinders of the Magnus rotors causes lift, which in turn causes frames 870 to revolve around the central axis 860. The device is significantly simpler than the devices of the prior art because the rotors do not fight each other during rotation. The Magnus rotors 85 are driven by motors 825 and corresponding pinions each having respective integral clutches 820. Each motor 825 rotates the corresponding Magnus rotor 85 through positions A through E. Each clutch 820 disengages its respective motor 825 when the associated Magnus rotor 85 moves from position E to position A. This make the Magnus rotors 85 located in the downstream half of the rotary energy harvester 81 (the trailing rotors) not fight the force generated in the Magnus rotors 85 located in the upstream half of the rotary energy harvester 81 (the leading rotors). In an alternative design, the motors 825 could be stopped once in position E and then run in reverse from position E to position A where the motors 825 are stopped again and then driven forward. By doing this an additional force is gained from the lift generated by the trailing Magnus rotors 85. If the fluid flow 890 is reversed similar to that found in a tidal basin where the tide comes in and goes out the lift generated by the Magnus rotor 85 will be in the opposite direction desired. To generate power in both directions of fluid flow 890, the rotor can be reversed by changing the direction of the drive motor 820 to maintain the lift in the same direction to drive the rotary motion so that it continues to produce power.

Means of driving the Magnus rotors 85 other than motors 820 are also within the scope of the present invention. A clutch could be built into the motor 820 or pinion 825 to stop the motor rotation, planetary gears could be used, or a cam could be used which slides the motor 820 so it is engaged and disengaged from the Magnus rotor 85.

Figure 21:
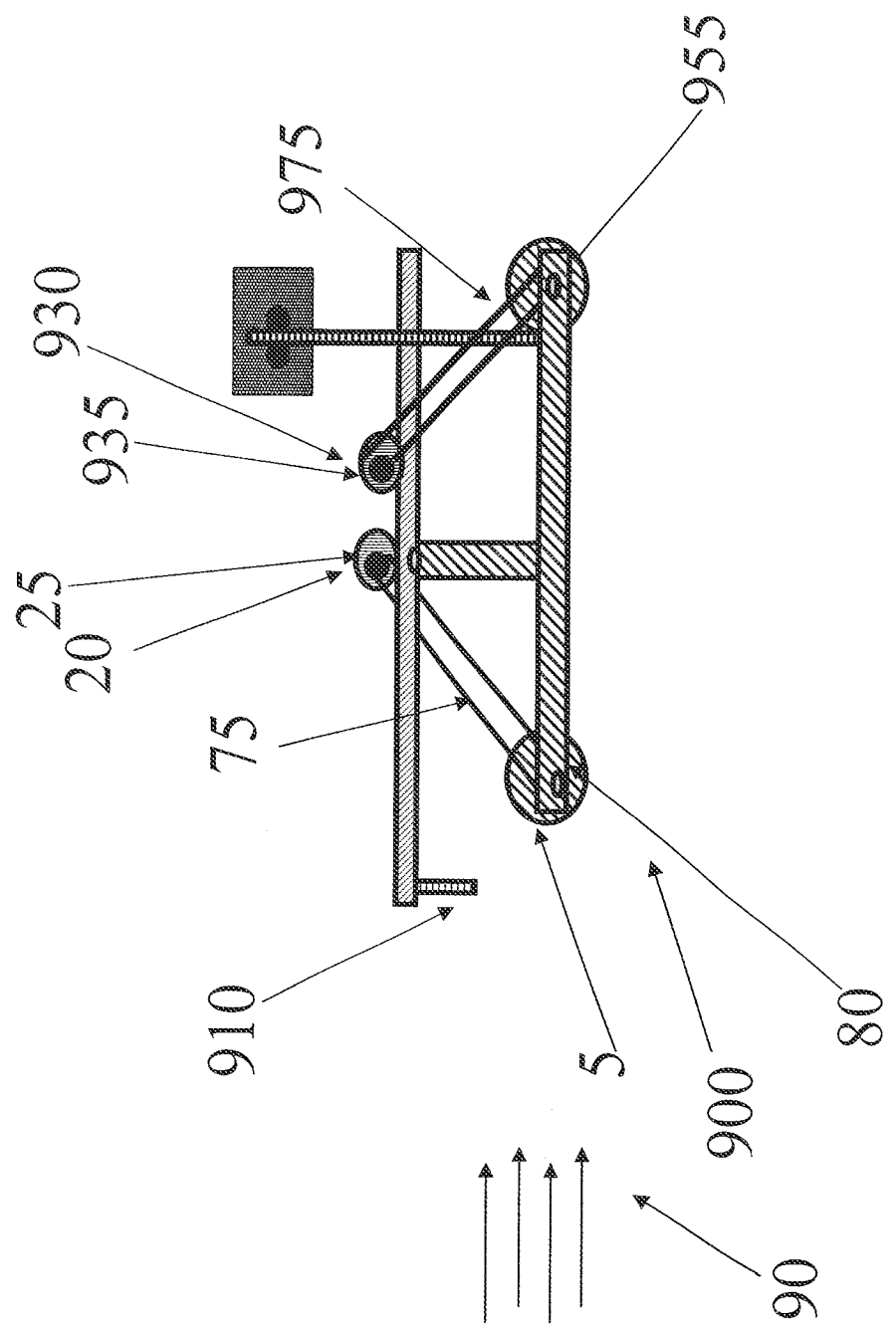
FIG. 21 is a schematic illustration of a side view of two rotating Magnus rotors showing counter balancing.

Referring now to FIG. 21, a schematic illustration of energy harvester 900 is shown. The energy harvester 900 utilizes two rotating Magnus rotors for counter balancing. To affect the counter balancing, the Magnus rotor 955 is distally located from Magnus rotor 5 and is driven in reverse of the direction driven by Magnus rotor 5. The lift created by the Magnus rotor 955 causes the return of the Magnus rotor 5 to the position distal from the stall baffle 910. Motor 925, pinion 930, and belt 975 drive Magnus rotor 955. The present invention is not limited in this regard, as mechanisms other than motor 925, pinion 930, and belt 975 may drive Magnus rotor 955.

Figure 22:
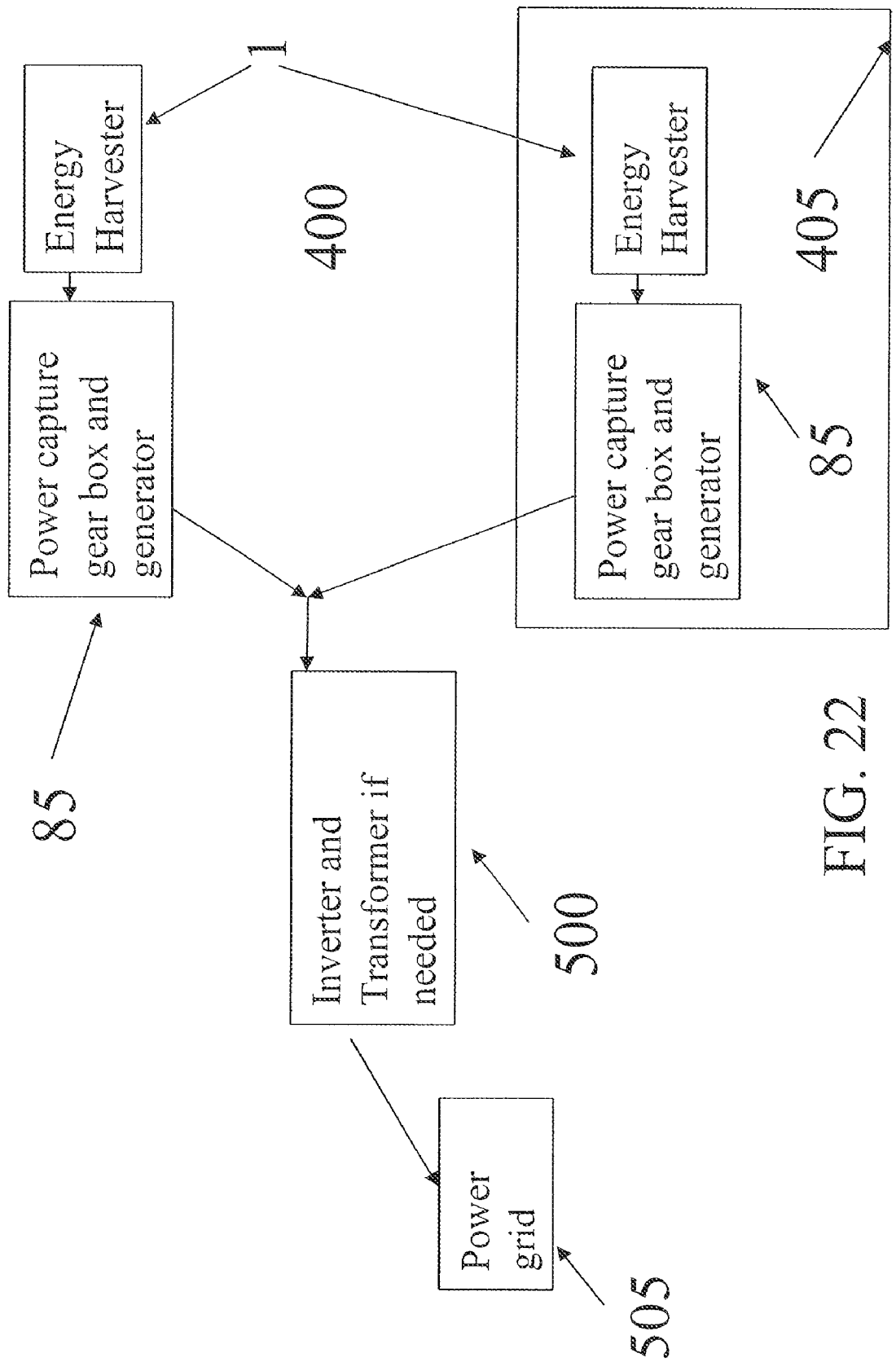
FIG. 22 is a block diagram of a process of transferring power from one or more energy harvesters directly to the power grid.

Referring now to FIG. 22, a block diagram of a process of transferring power from one or more energy harvesters directly to the power grid is shown. Energy harvesters 1 drive power capture gear boxes and generator 85 which is connected directly to Inverter and transformer 500 and the grid 505.

Figure 23:
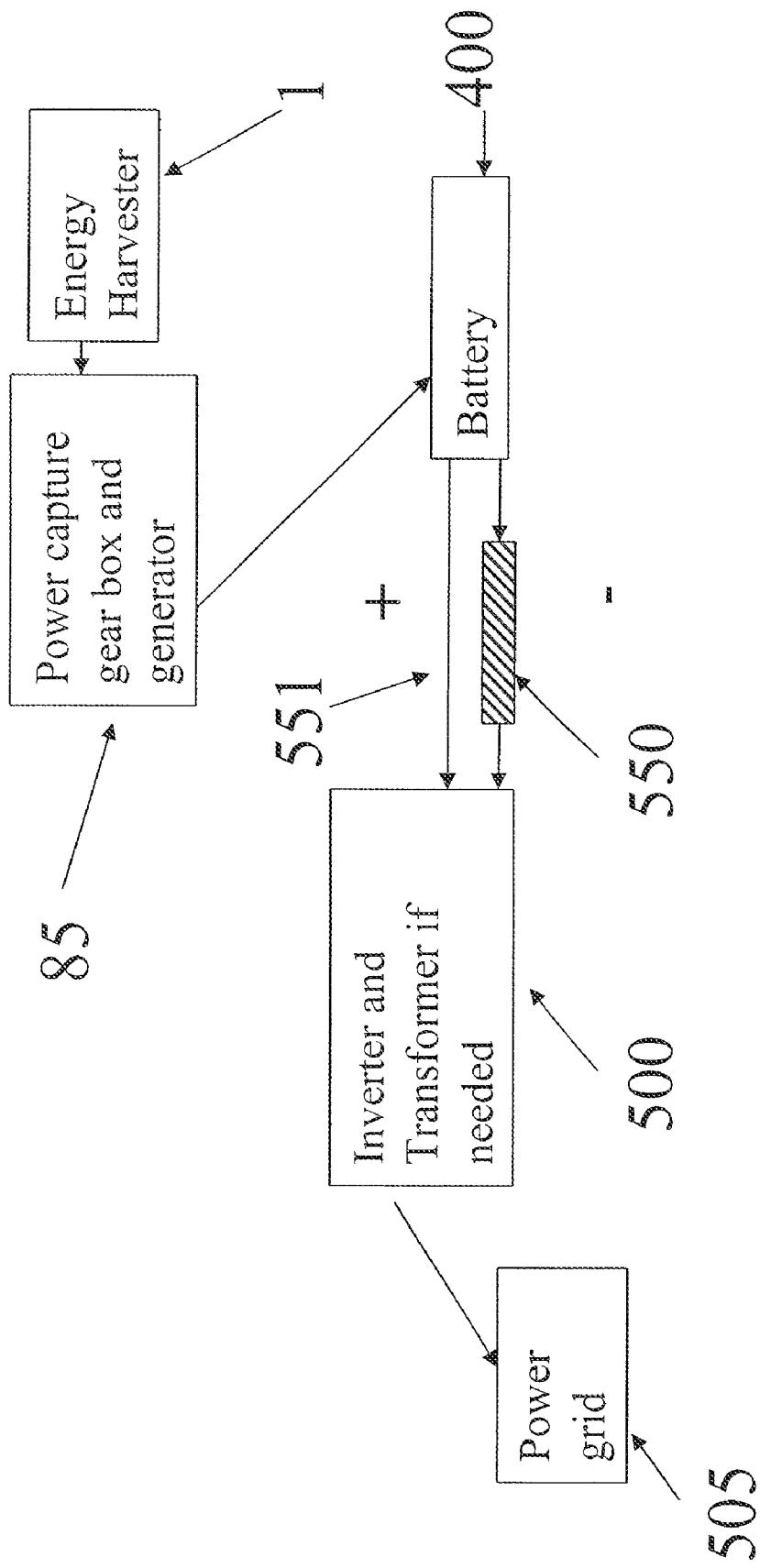
FIG. 23 is a block diagram showing a hydraulic energy harvester designed for use in building piping systems transferring one side of the power through the piping system.

Referring now to FIG. 23, a block diagram showing a hydraulic energy harvester 1 designed for use in building piping systems is shown. The energy harvester 1 used in such a system transfers one side of the power through the piping system 550 and the other side of the power through cable 551. By using piping system 550, the installation of the energy harvester is simplified. In some installations that utilize double insulated pipes, the system can use the pipes to transfer the power and without having to use the cable 551.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. An energy harvester, comprising:
   a fluid flow path defined by an inflow fluid channel, an outflow fluid channel, and a chamber disposed between said inflow fluid channel and said outflow channel;
   a Magnus rotor transversely mounted in said chamber and being movable in said fluid flow path between a first position and a second position, said Magnus rotor being rotationally driven by a motor;
   at least one counter balancing system cooperatively associated with said Magnus rotor;
   a means for producing an electrical current from a movement of said Magnus rotor in said fluid flow path, said means for producing said electrical current comprising,
      a rack movable in response to movement of said Magnus rotor, and
      at least one pinion gear drivable by a movement of said rack, said pinion gear being operably connected to an electrical generator,
      wherein driving of said pinion gear operably connected to said electrical generator produces said electrical current;
   a battery for charging by said electrical current produced from said means for producing said electrical current; and
   means for connecting said battery to an electrical grid.

2. The energy harvester of claim 1, wherein said counter balancing system is a counter weight.

3. The energy harvester of claim 1, wherein said counter balancing system is a cylinder containing hydraulics, pneumatics, or springs to provide a force suitable for returning said Magnus rotor to said first position from said second position.

4. The energy harvester of claim 1, wherein said energy harvester is attached to a floating platform.

5. The energy harvester of claim 1, wherein said energy harvester is attached to a non floating platform.

6. The energy harvester of claim 1 where a fluid in said fluid flow path is air.

7. The energy harvester of claim 1 where a fluid in said fluid flow path is water.

8. The energy harvester of claim 1 where said motor rotationally driving the Magnus rotor rotates a cylinder of the Magnus rotor in one direction for positive flow and in reverse direction for a negative flow.

9. The energy harvester of claim 1, wherein said means for producing said electrical current comprises, a crankshaft that is driveable in response to movement of said Magnus rotor.

10. The energy harvester of claim 1, wherein said means for producing said electrical current comprises,
    a magnet, and
    a coil in operable communication with said magnet,
       wherein a movement of said magnet relative to said coil produces said electrical current.

11. The energy harvester of claim 1, wherein the counter balancing system cooperatively associated with said Magnus rotor comprises opposing Magnus rotor.

12. The energy harvester of claim 1, wherein the electrical generator produces said electrical current and is connected directly to the power grid.

13. An energy harvesting system for use in an effluent system, said energy harvesting system comprising:
    a source of fluid;
    an outflow line extending from said source of fluid;
    a fluid flow path in said outflow line and defined by an inflow fluid channel, an outflow fluid channel, and an energy harvester chamber disposed between said inflow fluid channel and said outflow fluid channel, the outflow fluid channel being connected to one or more of a sewer, a water treatment facility, a water drain, a holding pond, and a holding tank;
    a Magnus rotor transversely mounted in said energy harvester chamber and movable between a first position and a second position;
    at least one counter balancing system cooperatively associated with said Magnus rotor;
    means for producing an electrical current from a movement of said Magnus rotor in said fluid flow path;
    a battery operably connected to said means for producing said electrical current, said battery being for charging by the electrical current; and
    means for connecting said battery to an electrical power grid.

14. The energy harvesting system of claim 13, wherein said counter balancing system is a counterweight.

15. The energy harvesting system of claim 13, wherein said counter balancing system is a cylinder containing hydraulics, pneumatics, or springs to provide a force suitable for returning said Magnus rotor to said first position from a second position.

16. The energy harvesting system of claim 13 wherein the water drain comprises a roof drain.

17. The energy harvesting system of claim 13 wherein the water drain comprises an air conditioning line.

18. The energy harvester of claim 13, wherein a first portion of power generated is transferred through an outflow line of a piping system to drive the Magnus rotor and a second portion of the power is directed to an inverter.

19. The energy harvester of claim 13, wherein a first portion of power generated is transferred through an inflow line of a piping system to drive the Magnus rotor and a second portion of the power is directed to an inverter.

20. A energy harvester for harnessing wave action in a body of liquid, comprising:
    a fluid flow path defined by an inflow fluid channel, an outflow fluid channel, and an energy harvester chamber disposed between said inflow fluid channel and said outflow fluid channel;

a Magnus rotor transversely mounted in said energy harvester chamber so that said Magnus rotor floats on a surface of a fluid level said body of liquid and is movable with changes in said fluid level from a first position to a second position;

at least one counter balancing system capable of returning said Magnus rotor from said second position to said first position;

means for generating an electrical current based on movement of said Magnus rotor between said first position and said second position;

a battery for charging by the electrical current from said means for generating said electrical current; and means for discharging said battery to an electrical grid.

21. A floating energy harvester assembly, comprising:

a catamaran for floating on a surface of a flowing liquid; and an energy harvester attached to said catamaran, said energy harvester being oriented perpendicularly to a current of said flowing liquid and located below a surface of said flowing liquid, said energy harvester comprising,
  a Magnus rotor transversely mounted and movable in said current of said flowing liquid between a first position and a second position,
  at least one counter balancing system cooperatively associated with said Magnus rotor,
  means for producing an electrical current from a movement of said Magnus rotor in said flowing liquid, said means for producing an electrical current comprising,
    a rack movable in response to movement of said Magnus rotor, and
    at least one pinion gear drivable by a movement of said rack, said pinion gear being operably connected to an electrical generator,
    wherein driving of said pinion gear operably connected to said electrical generator produces said electrical current;
  a battery for charging by said electrical current produced from said means for producing said electrical current; and
  means for connecting said battery to an electrical grid;
wherein said energy harvester generates power from said current of said flowing liquid.

22. A system for harnessing the energy of a reversible current flow of a water body, said system comprising:

an energy harvester disposed at a surface of the water body, said energy harvester being capable of rotation under reversible fluid flow and comprising,
  a rotatable shaft extending below said surface of the water body and perpendicularly to a direction of current flow,
  a plurality of support members fixedly mounted to said rotatable shaft and extending substantially perpendicular to said rotatable shaft for rotation therewith in a plane perpendicular to said rotatable shaft, and
  a plurality of cylindrically-shaped Magnus rotors, each being operably mounted to a corresponding support member so as to be parallel to and radially spaced from said rotatable shaft, each Magnus rotor having a drive mechanism associated therewith for rotation in a plane parallel to said direction of current flow, and
a generator operably connected to said rotatable shaft of said energy harvester;
wherein said flow of said water body past said rotatable shaft of said energy harvester delimits an upstream portion of flow and a downstream portion of flow; and
wherein upon rotation of said Magnus rotors through said upstream portion of flow said Magnus rotors rotate in a first direction;
wherein upon rotation of said Magnus rotors through said downstream portion of flow said Magnus rotors are stopped.

23. The system of claim 22, wherein upon rotation of said Magnus rotors through said downstream portion of flow said Magnus rotors rotate in a direction opposite said first direction.

24. The system of claim 22, wherein said energy harvester further comprises a pinion and a clutch associated with said drive mechanism of each of said Magnus rotors.

25. A system for harnessing energy of current flow and wave action of a water body, said system comprising:

a support located at a surface of said water body;

an energy harvester capable of operation under reversible fluid flow and wave motion, said energy harvester being variably positionable relative to a said surface of said water body, said energy harvester comprising;
  a Magnus rotor and reciprocating mechanism mounted so as to extend perpendicularly to a direction of said current flow, said Magnus rotor being movable by at least one of said reversible fluid flow and said wave action between a first position and a second position, said Magnus rotor being rotationally driven by a motor; and
  at least one counter balancing system cooperatively associated with said Magnus rotor;

a generator in communication with said energy harvester;

a rack movable in response to movement of said Magnus rotor; and at least one pinion gear drivable by a movement of said rack, said pinion gear being operably connected to said generator;

wherein driving of said pinion gear operably connected to said generator produces an electrical current.

26. The system of claim 25, wherein said support is a bridge, an abutment, a barge, a floating vessel, or a building.

27. The system of claim 25, wherein said counter balancing system is a counter weight.

28. The energy harvester of claim 25, wherein said counter balancing system is a cylinder containing hydraulics, pneumatics, or springs to provide a force suitable for returning said Magnus rotor to said first position from said second position.

29. The energy harvester of claim 25, wherein said generator comprises,
  a magnet movable in response to movement of said Magnus rotor, and
  a coil in operable communication with said magnet,
  wherein a movement of said magnet relative to said coil produces an electrical current.

30. A floating energy harvester assembly, comprising:

a catamaran for floating on a surface of a flowing liquid; and an energy harvester attached to said catamaran, said energy harvester being oriented perpendicularly to a current of said flowing liquid and located below a surface of said flowing liquid;

wherein said energy harvester generates power from said current of said flowing liquid, said energy harvester comprising,
  a Magnus rotor transversely mounted and movable in said current of said flowing liquid between a first position and a second position;
  at least one counter balancing system cooperatively associated with said Magnus rotor;

means for producing an electrical current from a movement of said Magnus rotor in said flowing liquid, said means for producing an electrical current comprising,
a magnet, and
a coil in operable communication with said magnet, wherein a movement of said magnet relative to said coil produces said electrical current;

a battery for charging by said electrical current produced from said means for producing said electrical current; and means for connecting said battery to an electrical grid.

* * * * *